(12) United States Patent
Takei

(10) Patent No.: US 11,391,961 B2
(45) Date of Patent: Jul. 19, 2022

(54) OPTICAL UNIT WITH SHAKE CORRECTION FUNCTION

(71) Applicant: NIDEC SANKYO CORPORATION, Nagano (JP)

(72) Inventor: Hiromitsu Takei, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 228 days.

(21) Appl. No.: 16/894,855

(22) Filed: Jun. 7, 2020

(65) Prior Publication Data

US 2020/0393692 A1 Dec. 17, 2020

(30) Foreign Application Priority Data

Jun. 14, 2019 (JP) .............................. JP2019-110954

(51) Int. Cl.
*G02B 27/64* (2006.01)
*H02K 41/035* (2006.01)
*G03B 5/06* (2021.01)

(52) U.S. Cl.
CPC ............ *G02B 27/646* (2013.01); *G03B 5/06* (2013.01); *H02K 41/0356* (2013.01); *G03B 2205/0023* (2013.01)

(58) Field of Classification Search
CPC .... G02B 27/646; H02K 41/0356; G03B 5/00; G03B 17/12; G03B 2205/0007; G03B 5/06; G03B 2205/0023
See application file for complete search history.

(56) References Cited

U.S. PATENT DOCUMENTS

| 9,891,444 | B2 | 2/2018 | Minamisawa |
| 10,649,226 | B2 | 5/2020 | Minamisawa et al. |
| 10,976,640 | B2 | 4/2021 | Minamisawa et al. |
| 2018/0129066 | A1 | 5/2018 | Minamisawa et al. |
| 2021/0318592 | A1* | 10/2021 | Kim ..................... H04N 5/2254 |

FOREIGN PATENT DOCUMENTS

| CN | 104919366 | 9/2015 |
| CN | 108073011 | 5/2018 |
| CN | 108693680 | 10/2018 |
| CN | 109031854 | 12/2018 |
| JP | 2015082072 | 4/2015 |

OTHER PUBLICATIONS

"Office Action of China Counterpart Application", dated Aug. 4, 2021, with English translation thereof, pp. 1-12.

* cited by examiner

*Primary Examiner* — Cara E Rakowski
(74) *Attorney, Agent, or Firm* — JCIPRNET

(57) ABSTRACT

An optical unit with a shake correction function includes a turning support mechanism structured to turnably support a movable body having a lens around an optical axis, and a gimbal mechanism structured to turnably support the turning support mechanism. The gimbal mechanism includes a gimbal frame and a first connection mechanism which turnably connects a plate holder with the gimbal frame around a first axis, and the first connection mechanism includes a first support member which is protruded from the gimbal frame to a side of the plate holder on the first axis, and a first concave curved face which is provided in the plate holder and is turnably brought into contact with a tip end of the first support member. A reinforcement member is fixed to the gimbal frame so that a portion of the gimbal frame where the first axis is passed is reinforced.

19 Claims, 14 Drawing Sheets

OPTICAL UNIT WITH SHAKE CORRECTION FUNCTION

CROSS REFERENCE TO RELATED APPLICATION

The present application claims priority under 35 U.S.C. § 119 to Japanese Application No. 2019-110954 filed on Jun. 14, 2019, and the entire content of which is incorporated herein by reference.

TECHNICAL FIELD

The present invention relates to an optical unit with a shake correction function structured to perform a shake correction by turning an imaging module around predetermined three axes.

BACKGROUND

In an optical unit which is mounted on a portable terminal or a movement body, in order to restrain disturbance of a photographed image of the portable terminal or when the movement body is moved, an optical unit has been known in which a movable body on which an optical module is mounted is turnable around an optical axis, around a first axis perpendicular to the optical axis, and around a second axis perpendicular to the optical axis and the first axis. Such an optical unit with a shake correction function is disclosed in Japanese Patent Laid-Open No. 2015-82072 (Patent Literature 1).

An optical unit with a shake correction function described in Patent Literature 1 includes a movable body, a fixed body and a turning support mechanism structured to turnably support the movable body around a predetermined axial line with respect to the fixed body. The movable body includes an optical module having a lens, a support body which surrounds the optical module, and a gimbal mechanism structured to turnably support the optical module around a first axis and around a second axis on an inner side of the support body. Further, the optical unit with a shake correction function includes a turning magnetic drive mechanism structured to turn the optical module around the first axis and around the second axis in the movable body, and a rolling magnetic drive mechanism structured to turn the movable body around a predetermined axial line and thereby to turn the optical module around an optical axis.

In the optical unit with a shake correction function described in Patent Literature 1, when the optical module is not turned around the first axis or around the second axis, a predetermined axial line (turning axis of the movable body) around which the movable body is turned by the turning support mechanism and an optical axis are coincided with each other. However, when the optical module is turned around the first axis or around the second axis, the turning axis of the movable body by the turning support mechanism is deviated from the optical axis of the optical module on the movable body. Therefore, when the optical module is turned around the first axis or around the second axis, if the rolling magnetic drive mechanism is driven to turn the movable body, a problem occurs that the optical module is not turned around the optical axis.

SUMMARY

In view of the problem described above, the present invention provides an optical unit with a shake correction function in which the turning axis of the movable body and the optical axis are capable of being coincided with each other.

To solve the above-mentioned problem, the present invention provides an optical unit with a shake correction function including a movable body having a lens, a turning support mechanism structured to turnably support the movable body around an optical axis of the lens, a gimbal mechanism structured to turnably support the turning support mechanism around a first axis intersecting the optical axis and turnably support the turning support mechanism around a second axis intersecting the optical axis and the first axis, a fixed body which supports the movable body through the gimbal mechanism and the turning support mechanism, a shake correction magnetic drive mechanism structured to turn the movable body around the first axis and around the second axis, and a rolling correction magnetic drive mechanism structured to turn the movable body around the optical axis. The turning support mechanism includes a plate roll which is fixed to the movable body, a plate holder provided with a facing part which faces the plate roll in a direction of the optical axis, and a turning mechanism which is provided between the plate roll and the facing part and is structured so that the plate roll is turnable with respect to the plate holder around the optical axis. The gimbal mechanism includes a gimbal frame and a first connection mechanism which turnably connects the plate holder with the gimbal frame around the first axis, and the first connection mechanism includes a first support member which is protruded from the gimbal frame to a side of the plate holder on the first axis, and a first concave curved face which is provided in the plate holder and is turnably brought into contact with a tip end of the first support member. A reinforcement member is fixed to the gimbal frame so that a portion of the gimbal frame where the first axis is passed is reinforced.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
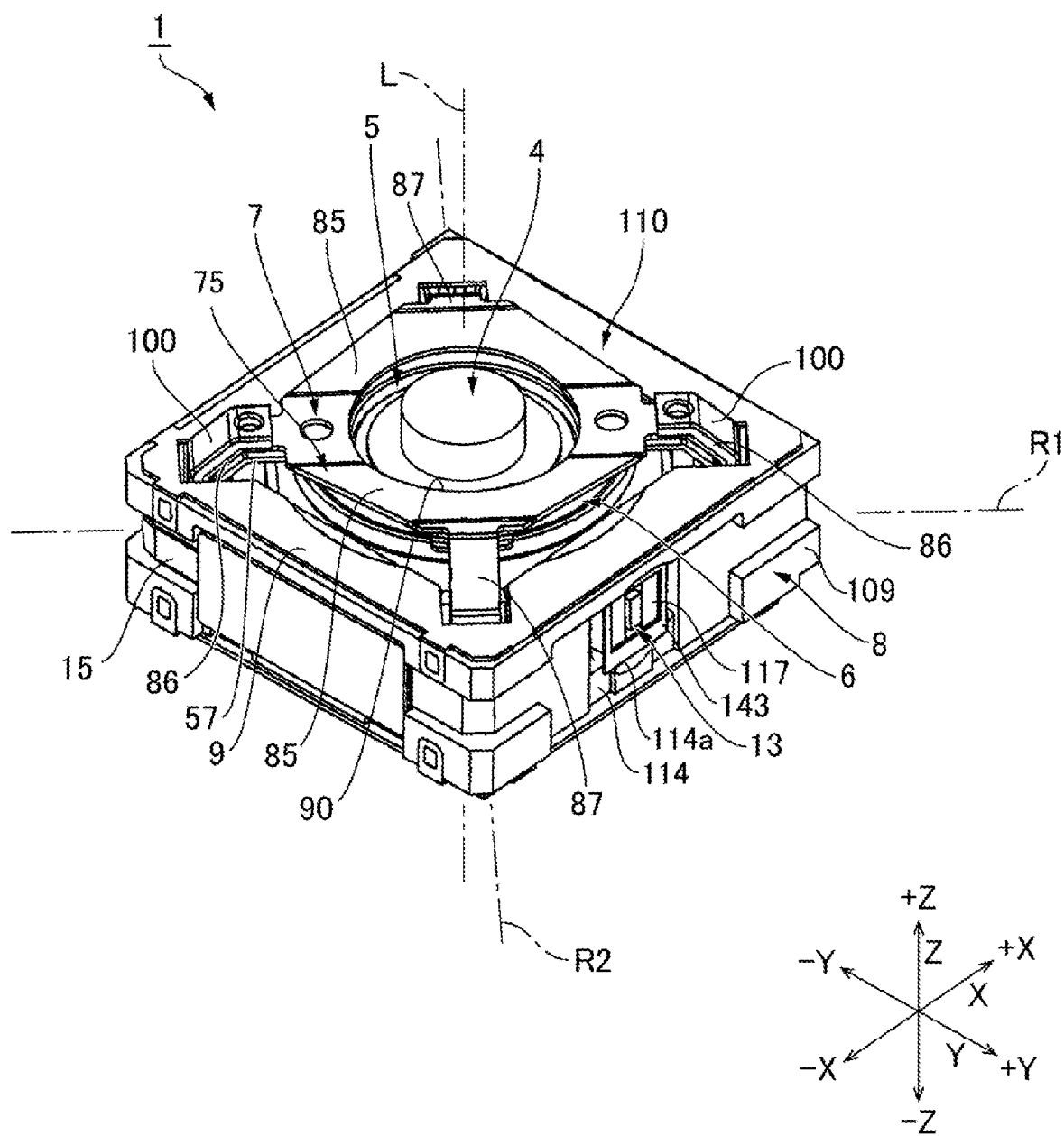
FIG. 1 is a perspective view showing an optical unit with a shake correction function.

According to the present invention, the turning support mechanism which turnably supports the movable body around the optical axis is turnably supported around the first axis and around the second axis intersecting the optical axis by the gimbal mechanism. Therefore, the turning support mechanism is capable of turning around the first axis and around the second axis together with the movable body. Therefore, even when the movable body is turned around the first axis or around the second axis, the turning axis of the movable body by the turning support mechanism and the optical axis of the movable body are coincided with each other. Therefore, in a case that the movable body is turning around the first axis or around the second axis, when the rolling correction magnetic drive mechanism is driven to turn the movable body, the movable body is turned around the optical axis.

In the present invention, the turning support mechanism which supports the movable body is supported by the gimbal frame through the first connection mechanism. Therefore, in comparison with a case that the gimbal frame supports only the movable body through the first connection mechanism, a large load is applied to a portion of the gimbal frame structuring the first connection mechanism, in other words, a large load is applied to a portion and its periphery of the gimbal frame where the first axis is passed. In this case, when the gimbal frame is deformed due to a load from the first connection mechanism, a situation may be occurred that the first support member and the first concave curved face of the plate holder are separated from each other and the plate holder is unable to be turnably supported by the gimbal frame. In order to prevent such a problem, according to the present invention, the gimbal frame is fixed with the reinforcement member for reinforcing a portion of the gimbal frame where the first axis is passed. As a result, deformation of the gimbal frame can be prevented or suppressed and thus, a situation can be avoided that the plate holder is unable to be turnably supported by the gimbal frame.

In the present invention, it may be structured that, when one side in a direction of the optical axis is defined as a first direction and the other side in the direction of the optical axis is defined as a second direction, the gimbal frame includes a gimbal frame main body part which is located in the second direction with respect to the plate holder, and a pair of first gimbal frame extended parts which are protruded from the gimbal frame main body part to both sides in a direction of the first axis and are extended in the first direction. The pair of the first gimbal frame extended parts is located on an outer peripheral side with respect to the movable body. Each of the pair of the first gimbal frame extended parts is provided with a first extended portion of the first gimbal frame extended part which is extended in a direction separated from the gimbal frame main body part in the direction of the first axis, a second extended portion of the first gimbal frame extended part which is inclined in the first direction from a tip end of the first extended portion of the first gimbal frame extended part toward a direction separated from the gimbal frame main body part, and a third extended portion of the first gimbal frame extended part which is extended in the first direction from an end in the first direction of the second extended portion of the first gimbal frame extended part on the outer peripheral side with respect to the plate holder. The first support member is protruded to a side of the movable body from the third extended portion of the first gimbal frame extended part, and the reinforcement member is fixed to each of the first gimbal frame extended parts. The reinforcement member is provided with a first reinforcement portion which is located in the second direction with respect to the first extended portion of the first gimbal frame extended part, a second reinforcement portion which is extended from an end on the outer peripheral side of the first reinforcement portion along the second extended portion of the first gimbal frame extended part, and a third reinforcement portion which is extended along the third extended portion of the first gimbal frame extended part from an end in the first direction of the second extended portion of the first gimbal frame extended part. According to this structure, each of a pair of the first gimbal frame extended parts can be prevented or suppressed by the reinforcement member from deforming in a direction separated from each other.

In the present invention, it may be structured that a thickness of the reinforcement member is thicker than a thickness of the first gimbal frame extended part in a laminated direction in a state that the first gimbal frame extended part and the reinforcement member are overlapped with each other. According to this structure, the reinforcement member is easily structured of a member whose rigidity is higher than that of the first gimbal frame extended part.

In the present invention, it may be structured that the third extended portion of the first gimbal frame extended part is provided with a gimbal frame extended part through-hole which penetrates through the third extended portion in a direction of the first axis, and a support member fixing tube part which is protruded to an opposite side to the movable body in the direction of the first axis from an opening edge of the gimbal frame extended part through-hole provided in the third extended portion of the first gimbal frame extended part. The third reinforcement portion is provided with a reinforcement member through-hole which penetrates through the third reinforcement portion in the direction of the first axis and is communicated with the gimbal frame extended part through-hole, and the support member fixing tube part is inserted into the reinforcement member through-hole, and the first support member is held by the support member fixing tube part and is protruded from the third extended portion of the first gimbal frame extended part. According to this structure, the first support member is held by the first gimbal frame extended part and the reinforcement member. Further, the first support member is inserted into the support member fixing tube part which is extended in the first axis direction and thus, the first support member can be moved in the first axis direction along the support member fixing tube part. As a result, a protruding amount of the first support member which is protruded from the first gimbal frame extended part to a side of the movable body can be adjusted. In this case, when a protruding amount of the first support member can be adjusted, a contact pressure of the first support member with the first concave curved face can be adjusted. Further, when a protruding amount of the first support member can be adjusted, a situation is easily avoided that the first support member and the first concave curved face are separated from each other and the plate holder is unable to be turnably supported by the gimbal frame.

In the present invention, it may be structured that the first support member is fixed to the third extended portion of the first gimbal frame extended part.

In the present invention, it may be structured that the third extended portion of the first gimbal frame extended part is provided with a gimbal frame extended part through-hole which penetrates through the third extended portion in the direction of the first axis, the third reinforcement portion is provided with a reinforcement member through-hole which penetrates through the third reinforcement portion in the direction of the first axis and is communicated with the gimbal frame extended part through-hole, the first support member is inserted into the reinforcement member through-hole and is fixed to the reinforcement member, and the first support member penetrates through the gimbal frame extended part through-hole and protrudes from the third extended portion of the first gimbal frame extended part to a side of the movable body. According to this structure, the first support member is held by the reinforcement member through-hole penetrating in the first axial direction and thus, the first support member can be moved in the first axis direction along the reinforcement member through-hole. As a result, a protruding amount of the first support member which is protruded from the gimbal frame extended part to a side of the movable body can be adjusted. In this case, when a protruding amount of the first support member can be adjusted, a contact pressure of the first support member with the first concave curved face can be adjusted. Further, when a protruding amount of the first support member can be adjusted, a situation is easily avoided that the first support member and the first concave curved face are separated from each other and the plate holder is unable to be turnably supported by the gimbal frame.

In the present invention, it may be structured that the third extended portion of the first gimbal frame extended part is provided with a gimbal frame extended part through-hole which penetrates through the third extended portion in the direction of the first axis, the third reinforcement portion is provided with a reinforcement member through-hole which penetrates through the third reinforcement portion in the direction of the first axis and is communicated with the gimbal frame extended part through-hole, the first support member is inserted into the gimbal frame extended part through-hole and the reinforcement member through-hole and is fixed to the third extended portion of the first gimbal frame extended part and the reinforcement member, and the first support member is protruded to a side of the movable body from the third extended portion of the first gimbal frame extended part. According to this structure, the first support member is held by the gimbal frame extended part through-hole and the reinforcement member through-hole penetrating in the first axial direction and thus, the first support member can be moved in the first axis direction along the gimbal frame extended part through-hole and the reinforcement member through-hole. As a result, a protruding amount of the first support member which is protruded from the gimbal frame extended part to a side of the movable body can be adjusted. In this case, when a protruding amount of the first support member can be adjusted, a contact pressure of the first support member with the first concave curved face can be adjusted. Further, when a protruding amount of the first support member can be adjusted, a situation is easily avoided that the first support member and the first concave curved face are separated from each other and the plate holder is unable to be turnably supported by the gimbal frame.

In the present invention, it may be structured that the reinforcement member is provided with an adhesive injection hole, which penetrates through the first reinforcement portion in the direction of the optical axis, and a communication groove which is extended along the first reinforcement portion, the second reinforcement portion and the third reinforcement portion on a surface of a side of the first gimbal frame extended part and is communicated with the adhesive injection hole. According to this structure, when an adhesive is injected into the adhesive injection hole after the reinforcement member is abutted with the first gimbal frame extended part, the adhesive is introduced into the communication groove. Therefore, the reinforcement member is easily fixed to the first gimbal frame extended part.

In the present invention, it may be structured that the reinforcement member is provided with a pair of first reinforcement member protruded parts which are protruded toward a side of the movable body on both sides of the first gimbal frame extended part in a circumferential direction around the optical axis, and a second reinforcement member protruded part which is protruded toward the side of the movable body in the first direction of the first gimbal frame extended part. The first gimbal frame extended part is provided with a pair of protruded parts of the first gimbal frame extended part protruded to both sides in the circumferential direction in the first direction with respect to the pair of the first reinforcement member protruded parts and, when viewed in the direction of the optical axis, the second reinforcement member protruded part and the third extended portion of the first gimbal frame extended part are overlapped with each other, and the pair of the first reinforcement member protruded parts and the pair of the protruded parts of the first gimbal frame extended part are overlapped with each other. According to this structure, the reinforcement member is prevented from coming out from the first gimbal frame extended part in the first direction by a pair of the first reinforcement member protruded parts and a pair of the protruded parts of the first gimbal frame extended part. Further, the reinforcement member can be prevented from coming out from the first gimbal frame extended part in the second direction by the second reinforcement member protruded part.

In the present invention, it may be structured that the gimbal mechanism includes a second connection mechanism which turnably connects the gimbal frame with the fixed body around the second axis, the gimbal frame is provided with a pair of second gimbal frame extended parts which are protruded from the gimbal frame main body part to both sides in a direction of the second axis and are extended in the first direction, the pair of the second gimbal frame extended parts is located on an outer peripheral side with respect to the movable body, and the fixed body includes a frame part which surrounds the movable body, the plate holder and the gimbal frame from an outer peripheral side. The second connection mechanism includes a second support member which is protruded to a side of the gimbal frame on the second axis from each of diagonal portions of the frame part in a direction of the second axis, and a second concave curved face which is provided in each of the pair of the second gimbal frame extended parts and is brought into contact with a tip end of the second support member. According to this structure, the turning support mechanism can be turnably supported by the gimbal mechanism around the second axis.

In the present invention, it may be structured that an inner peripheral face of the frame part is provided with a moving range restriction part which faces the reinforcement member through a first space in a circumferential direction and is abutted with the reinforcement member when the gimbal frame is displaced in the circumferential direction to restrict a moving range of the gimbal frame, and a turning range restriction part which faces the reinforcement member through a second space in a direction of the first axis and is abutted with the reinforcement member when the gimbal frame is turned around the second axis to restrict a turning range of the gimbal frame. According to this structure, in a case that an external force is applied or the like, a range that the gimbal frame is moved in the circumferential direction and a range that the gimbal frame is turned around the second axis can be restricted. Therefore, deformation and damage of the gimbal frame can be prevented or suppressed.

According to the present invention, the turning support mechanism which turnably supports the movable body around the optical axis is turnably supported by the gimbal mechanism around the first axis and around the second axis intersecting the optical axis. Therefore, the turning support mechanism is capable of turning around the first axis and around the second axis together with the movable body. Therefore, even when the movable body is turned around the first axis or around the second axis, the turning axis of the movable body by the turning support mechanism and the optical axis of the movable body are coincided with each other. Further, the gimbal frame of the gimbal mechanism is fixed with the reinforcement member which reinforces a portion of the gimbal frame to which the first support member for connecting the gimbal frame with the turning support mechanism is attached. Therefore, a situation can be avoided that the gimbal frame is deformed to be unable to turnably support the turning support mechanism.

Other features and advantages of the invention will be apparent from the following detailed description, taken in conjunction with the accompanying drawings that illustrate, by way of example, various features of embodiments of the invention.

Embodiments of an optical unit with a shake correction function to which the present invention is applied will be described below with reference to the accompanying drawings.

Entire Structure

Figure 2:
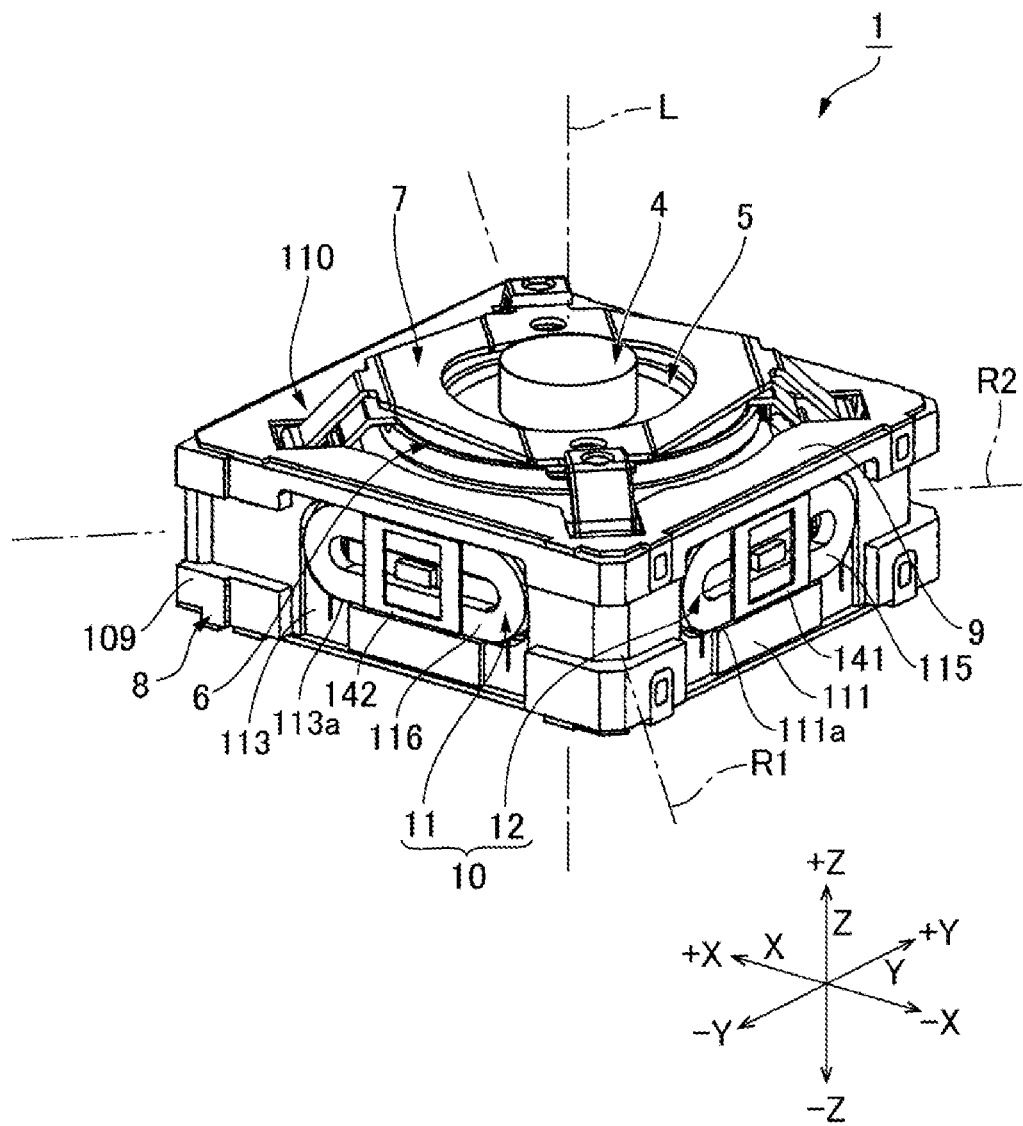
FIG. 2 is a perspective view showing the optical unit with a shake correction function from which a flexible printed circuit board is detached and which is viewed in a direction different from in FIG. 1.
Figure 3:
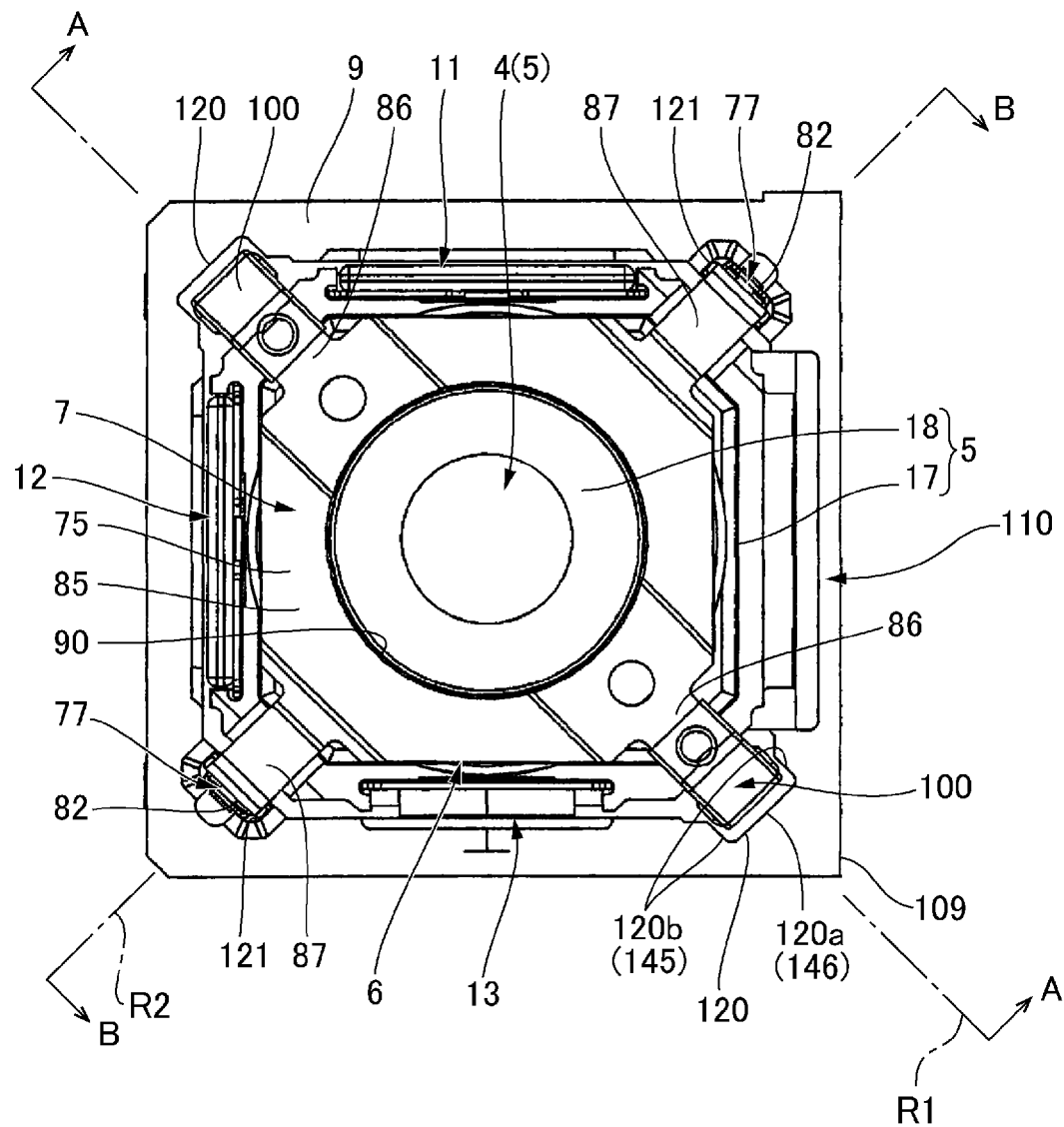
FIG. 3 is a plan view showing an optical unit with a shake correction function from which a cover is detached and which is viewed in an optical axis direction.
Figure 3:
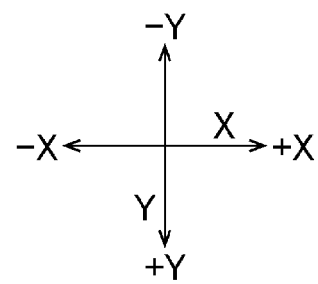
Figure 4:
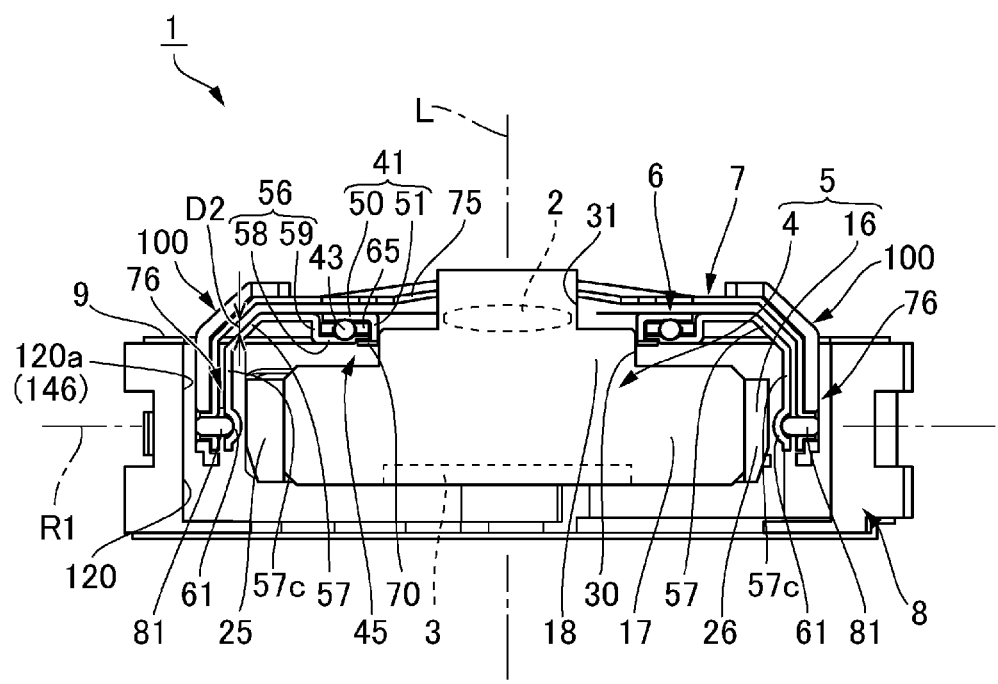
FIG. 4 is a cross-sectional view showing the optical unit with a shake correction function which is cut by the "A-A" line in FIG. 3.
Figure 4:
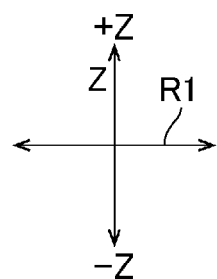
Figure 5:
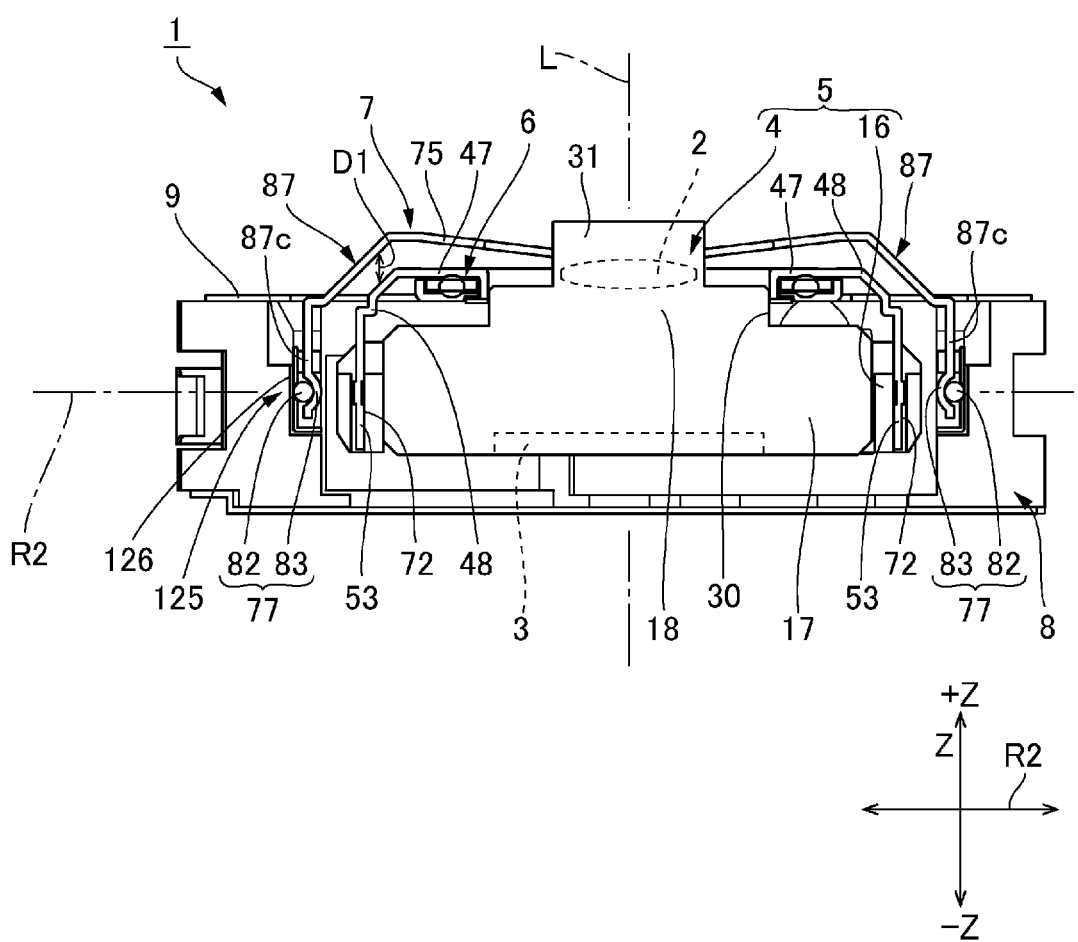
FIG. 5 is a cross-sectional view showing the optical unit with a shake correction function which is cut by the "B-B" line in FIG. 3.
Figure 6:
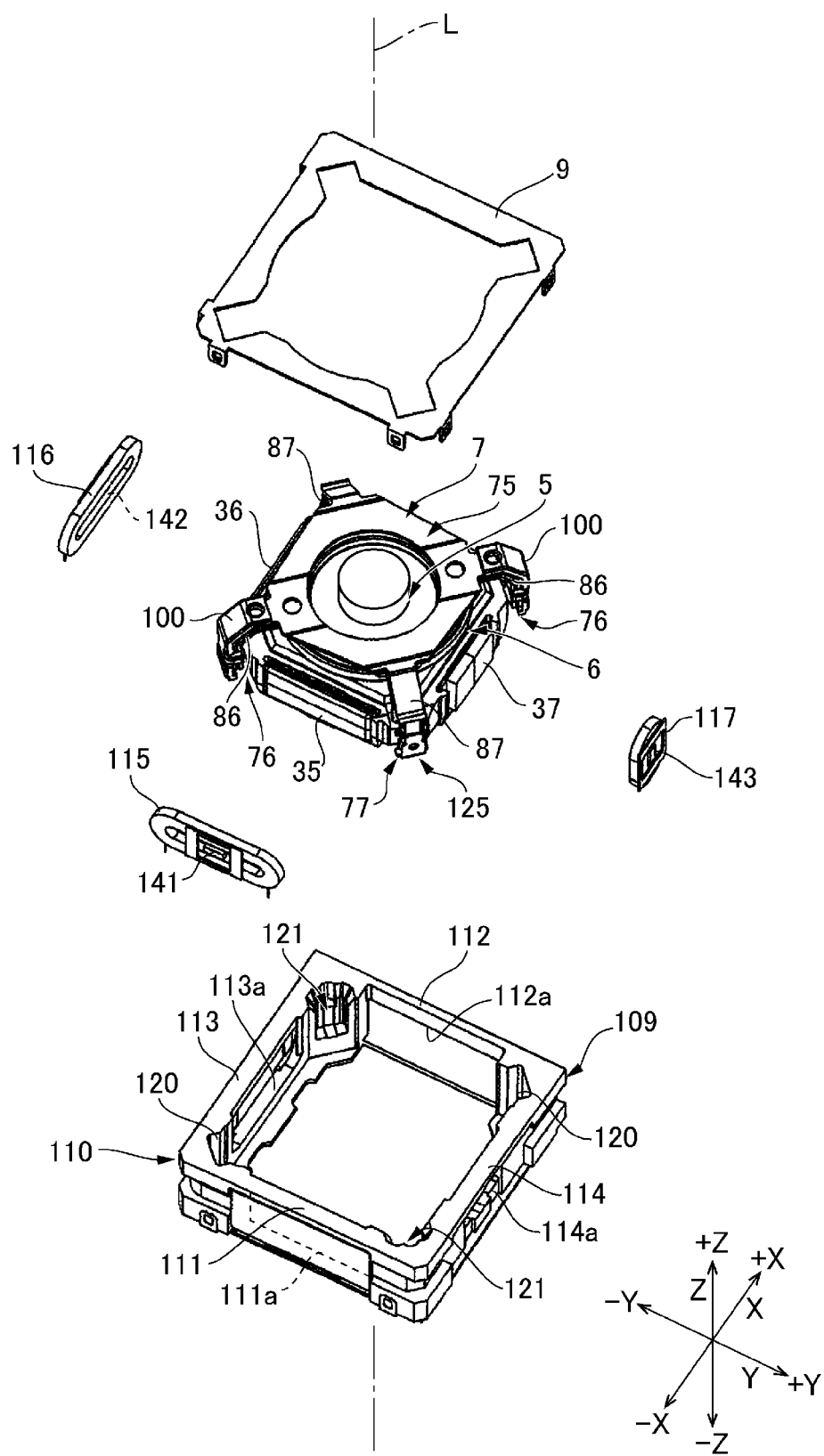
FIG. 6 is an exploded perspective view showing an optical unit with a shake correction function.
Figure 7:
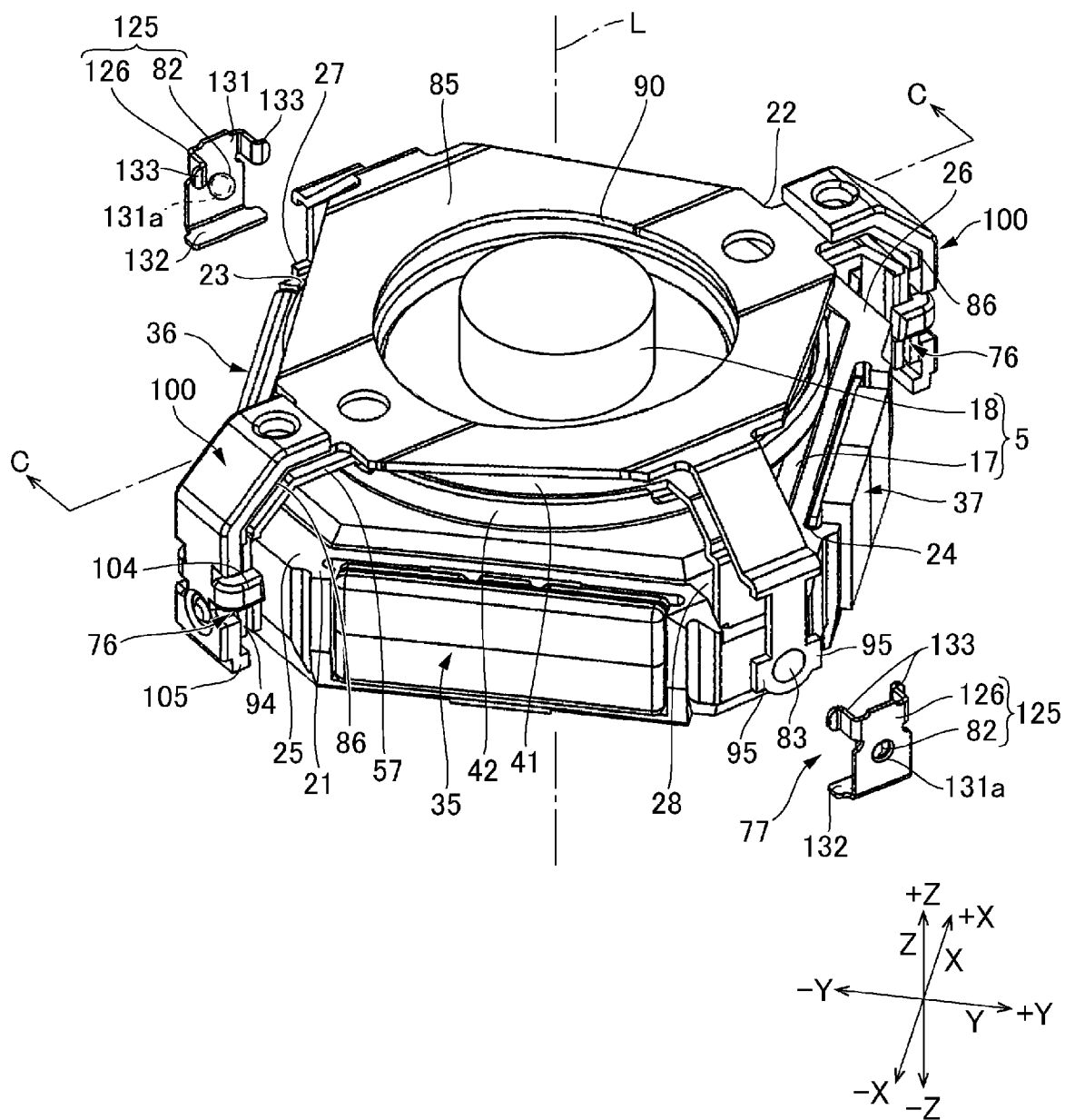
FIG. 7 is an explanatory perspective view showing a movable body, a turning support mechanism and a gimbal mechanism.
Figure 8:
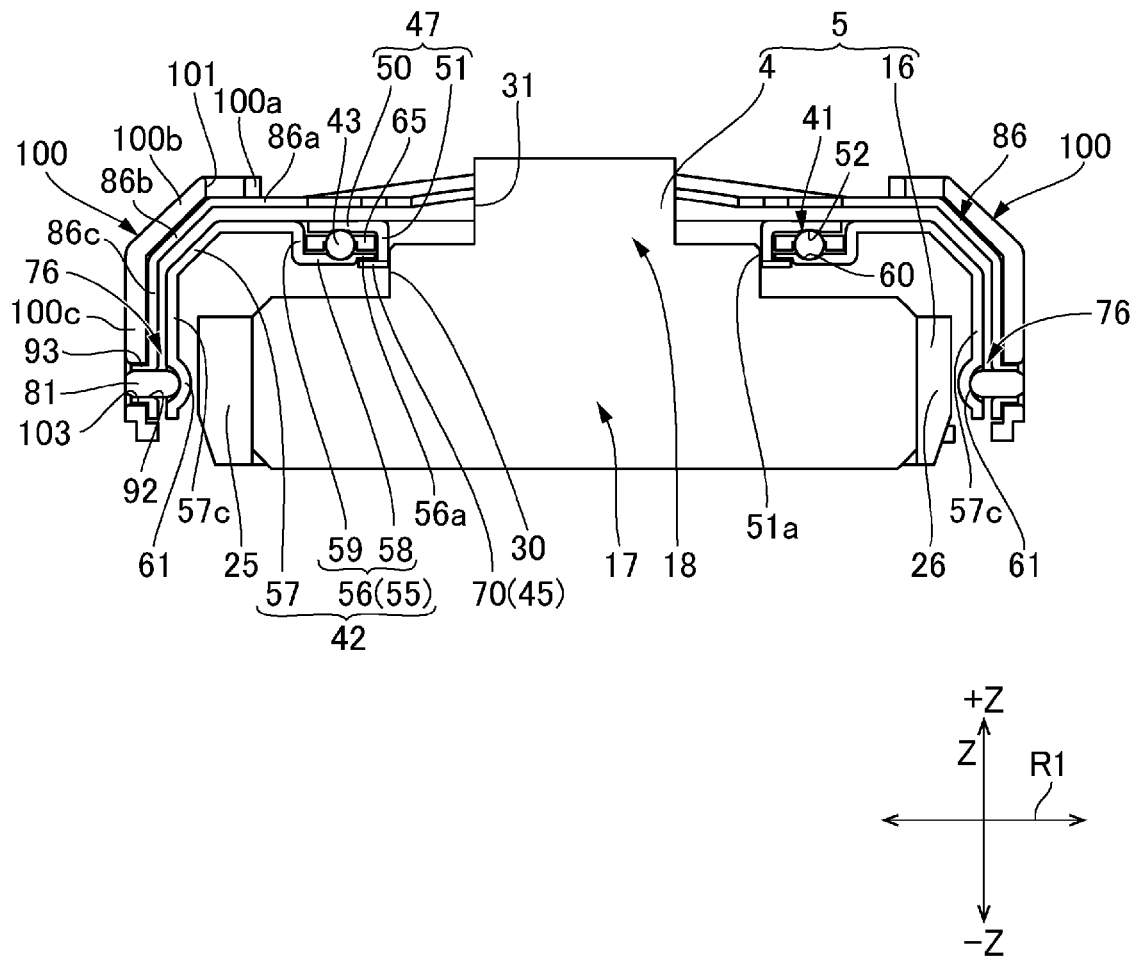
FIG. 8 is a cross-sectional view showing a movable body, a turning support mechanism, a gimbal frame and a first connection mechanism.
Figure 9:
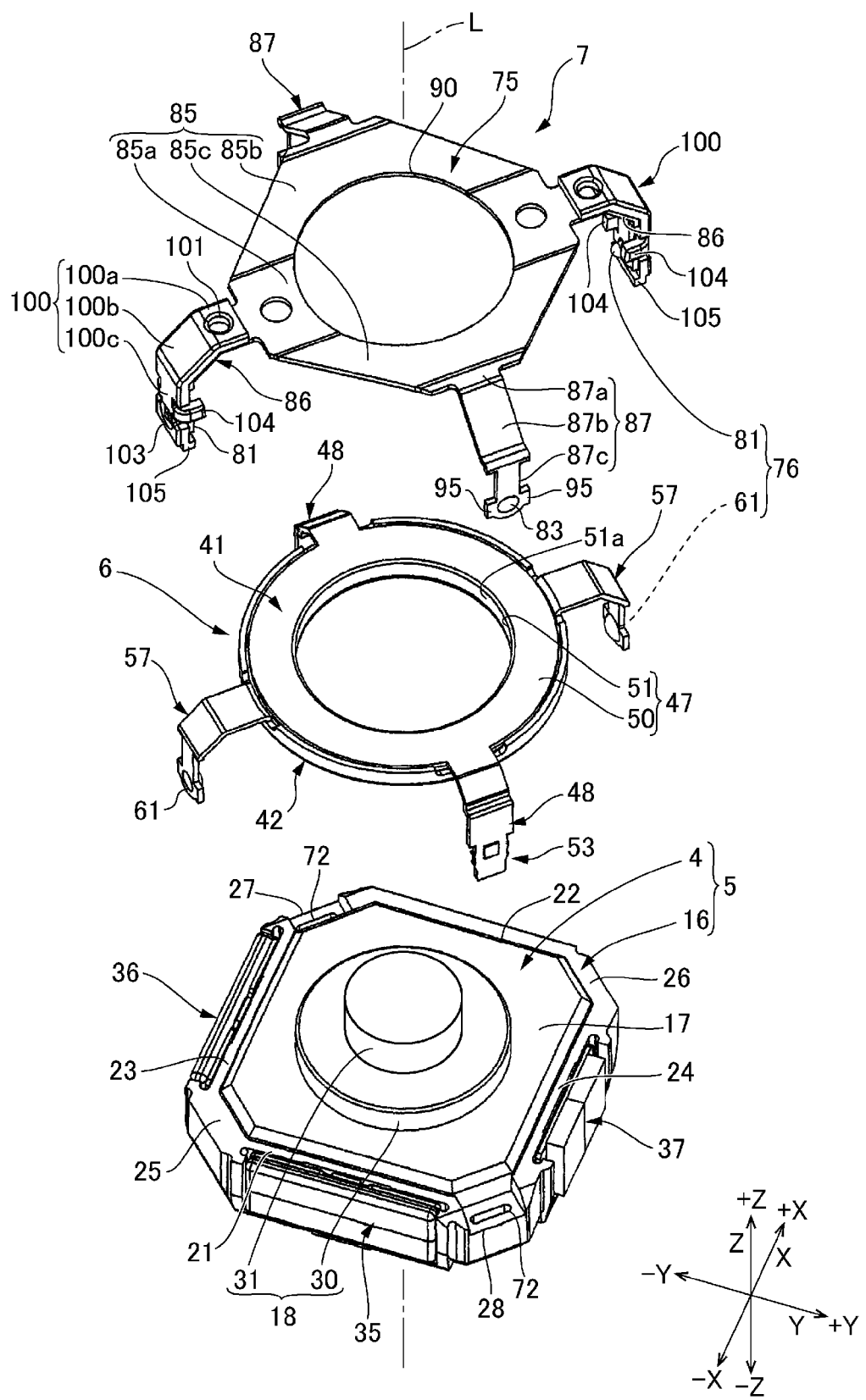
FIG. 9 is an exploded perspective view showing a movable body, a turning support mechanism and a gimbal frame.

FIG. 1 is a perspective view showing an optical unit with a shake correction function. FIG. 2 is a perspective view showing the optical unit with a shake correction function from which a flexible printed circuit board is detached and which is viewed in a direction different from in FIG. 1. FIG. 3 is a plan view showing an optical unit with a shake correction function from which a cover is detached and which is viewed in an optical axis direction. FIG. 4 is a cross-sectional view showing the optical unit with a shake correction function which is cut by the "A-A" line in FIG. 3. FIG. 5 is a cross-sectional view showing the optical unit with a shake correction function which is cut by the "B-B" line in FIG. 3. FIG. 6 is an exploded perspective view showing an optical unit with a shake correction function. FIG. 7 is an explanatory perspective view showing a movable body, a turning support mechanism and a gimbal mechanism. FIG. 8 is a cross-sectional view showing a movable body, a turning support mechanism and a gimbal frame. FIG. 9 is an exploded perspective view showing a movable body, a turning support mechanism, a gimbal frame and a first connection mechanism.

An optical unit 1 with a shake correction function includes an imaging module 4 having a lens 2 and an imaging element 3. The optical unit 1 with a shake correction function is, for example, used in an optical device such as a cell phone with a camera and a drive recorder or in an optical device such as an action camera mounted on a movement body such as a helmet, a bicycle, a radio-controlled helicopter or a wearable camera. In the optical device, when a shake is occurred in the optical device at the time of photographing, a disturbance is generated in a photographed image. In order to avoid a photographed image being inclined, the optical unit 1 with a shake correction function corrects an inclination of a movable body based on acceleration, angular velocity, shaking amount and the like detected by a detection means such as a gyroscope.

An optical unit 1 with a shake correction function in this embodiment performs a shake correction by turning the imaging module 4 around an optical axis "L", around a first axis "R1" perpendicular to the optical axis "L", and around a second axis "R2" perpendicular to the optical axis "L" and the first axis "R1". Therefore, the optical unit 1 with a shake correction function performs a rolling correction, a pitching correction and a yawing correction.

In the following descriptions, three axes perpendicular to each other are defined as an "X"-axis direction, a "Y"-axis direction and a "Z"-axis direction. Further, one side in the "X"-axis direction is referred to as a "−X" direction, and the other side is referred to as a "+X" direction. One side in the "Y"-axis direction is referred to as a "−Y" direction, and the other side is referred to as a "+Y" direction. One side in the "Z"-axis direction is referred to as a "−Z" direction (first direction), and the other side is referred to as a "+Z" direction (second direction). The "Z"-axis direction is an optical axis direction along the optical axis "L" of the lens 2 provided in the imaging module 4. The "−Z" direction is on an image side with respect to the imaging module 4, and the "+Z" direction is on an object side with respect to the imaging module 4. Further, a direction along the first axis "R1" is referred to as a first axis "R1" direction, and a direction along the second axis "R2" is referred to as a second axis "R2" direction. The first axis "R1" and the second axis "R2" are inclined by 45 degrees around the "Z"-axis with respect to the "X"-axis and the "Y"-axis.

As shown in FIG. 1, the optical unit 1 with a shake correction function includes a movable body 5 having the imaging module 4 and a turning support mechanism 6 structured to turnably support the movable body 5 around an optical axis "L". Further, the optical unit 1 with a shake correction function includes a gimbal mechanism 7 structured to turnably support the turning support mechanism 6 around the first axis "R1" and turnably support the turning support mechanism 6 around the second axis "R2", and a fixed body 8 which supports the movable body 5 through the gimbal mechanism 7 and the turning support mechanism 6. Therefore, the movable body 5 is swingably supported around the first axis "R1" and swingably supported around the second axis "R2" through the gimbal mechanism 7. In this embodiment, the movable body 5 is capable of being swung around the "X"-axis and around the "Y"-axis by combining turning around the first axis "R1" and turning around the second axis "R2".

The optical unit 1 with a shake correction function includes, as shown in FIG. 2, a shake correction magnetic drive mechanism 10 structured to turn the movable body 5 around the first axis "R1" and around the second axis "R2". The shake correction magnetic drive mechanism 10 includes a first shake correction magnetic drive mechanism 11 structured to generate a drive force to the movable body 5 around the "X"-axis and a second shake correction magnetic drive mechanism 12 structured to generate a drive force to the movable body 5 around the "Y"-axis. The first shake correction magnetic drive mechanism 11 is disposed in the "−Y" direction of the movable body 5. The second shake correction magnetic drive mechanism 12 is disposed in the "−X" direction of the movable body 5. In addition, the optical unit 1 with a shake correction function includes, as shown in FIGS. 1 and 3, a rolling correction magnetic drive mechanism 13 structured to turn the movable body 5 around the optical axis "L". The first shake correction magnetic drive mechanism 11, the second shake correction magnetic drive mechanism 12 and the rolling correction magnetic drive mechanism 13 are arranged in a circumferential direction around the optical axis "L". When viewed in a direction perpendicular to the optical axis "L", the rolling correction magnetic drive mechanism 13 is overlapped with the shake correction magnetic drive mechanism 10. In this embodiment, the rolling correction magnetic drive mechanism 13 and the first shake correction magnetic drive mechanism 11 are disposed at a position where they face each other with the optical axis "L" interposed therebetween. Further, as shown in FIG. 1, the optical unit 1 with a shake correction function includes a flexible printed circuit board 15 which is attached to the fixed body 8. In addition, the optical unit 1 with a shake correction function includes a flexible printed circuit board not shown which is extended outside from an end portion in the first direction of the movable body 5.

Further, the optical unit 1 with a shake correction function includes a cover 9 in a frame shape which is fixed to an end face in the "+Z" direction of the fixed body 8. When viewed in the "Z"-axis direction, the cover 9 is located on an outer peripheral side with respect to the movable body 5.

Movable Body

As shown in FIGS. 4, 5 and 8, the movable body 5 includes the imaging module 4 and an imaging module holder 16 which surrounds the imaging module 4 from an outer peripheral side. Further, the movable body 5 is provided with a movable body main body part 17 and a movable body protruded part 18 protruded in the "+Z" direction from the movable body main body part 17. The movable body protruded part 18 is a lens-barrel of the imaging module 4. A lens 2 is accommodated in the movable body protruded part 18. The movable body main body part 17 is structured of the imaging module holder 16 and a portion of the imaging module 4 which is located on an inner peripheral side of the imaging module holder 16. The imaging element 3 is accommodated in the movable body main body part 17. The imaging element 3 is disposed on the optical axis "L" of the lens 2 in the "−Z" direction with respect to the lens 2.

As shown in FIG. 3, a shape of the movable body main body part 17 which is viewed from an upper side is formed in a substantially octagonal shape. In other words, the movable body main body part 17 is, as shown in FIG. 9, provided with a first side wall 21 and a second side wall 22 which are extended in parallel to the "Y" direction, and a third side wall 23 and a fourth side wall 24 which are extended in parallel to the "X" direction. The first side wall 21 is located in the "−X" direction with respect to the second side wall 22. The third side wall 23 is located in the "−Y" direction with respect to the fourth side wall 24. Further, the movable body main body part 17 is provided with a fifth side wall 25 and a sixth side wall 26 which are located at diagonal positions in the first axis "R1" direction, and a seventh side wall 27 and an eighth side wall 28 which are located at diagonal positions in the second axis "R2" direction. The fifth side wall 25 is located in the "−X" direction with respect to the sixth side wall 26. The seventh side wall 27 is located in the "−Y" direction with respect to the eighth side wall 28.

The movable body protruded part 18 is protruded from a center portion of the movable body main body part 17. As shown in FIG. 4, the movable body protruded part 18 is provided with a cylindrical tube portion 30 which has a constant outer diameter dimension and is extended in the optical axis direction, and a small diameter tube portion 31 whose outer diameter dimension is smaller than that of the cylindrical tube portion 30 in the "+Z" direction with respect to the cylindrical tube portion 30. The cylindrical tube portion 30 and the small diameter tube portion 31 are connected with each other through a ring-shaped face which faces the "+Z" direction.

As shown in FIG. 9, the first magnet 35 is fixed to the first side wall 21 of the movable body 5. The first magnet 35 is divided into two pieces in the "Z"-axis direction. The second magnet 36 is fixed to the third side wall 23 of the movable body 5. The second magnet 36 is divided into two pieces in the "Z"-axis direction. The third magnet 37 is fixed to the fourth side wall 24 of the movable body 5. The third magnet 37 is divided into two pieces in a circumferential direction.

Turning Support Mechanism

Figure 10:
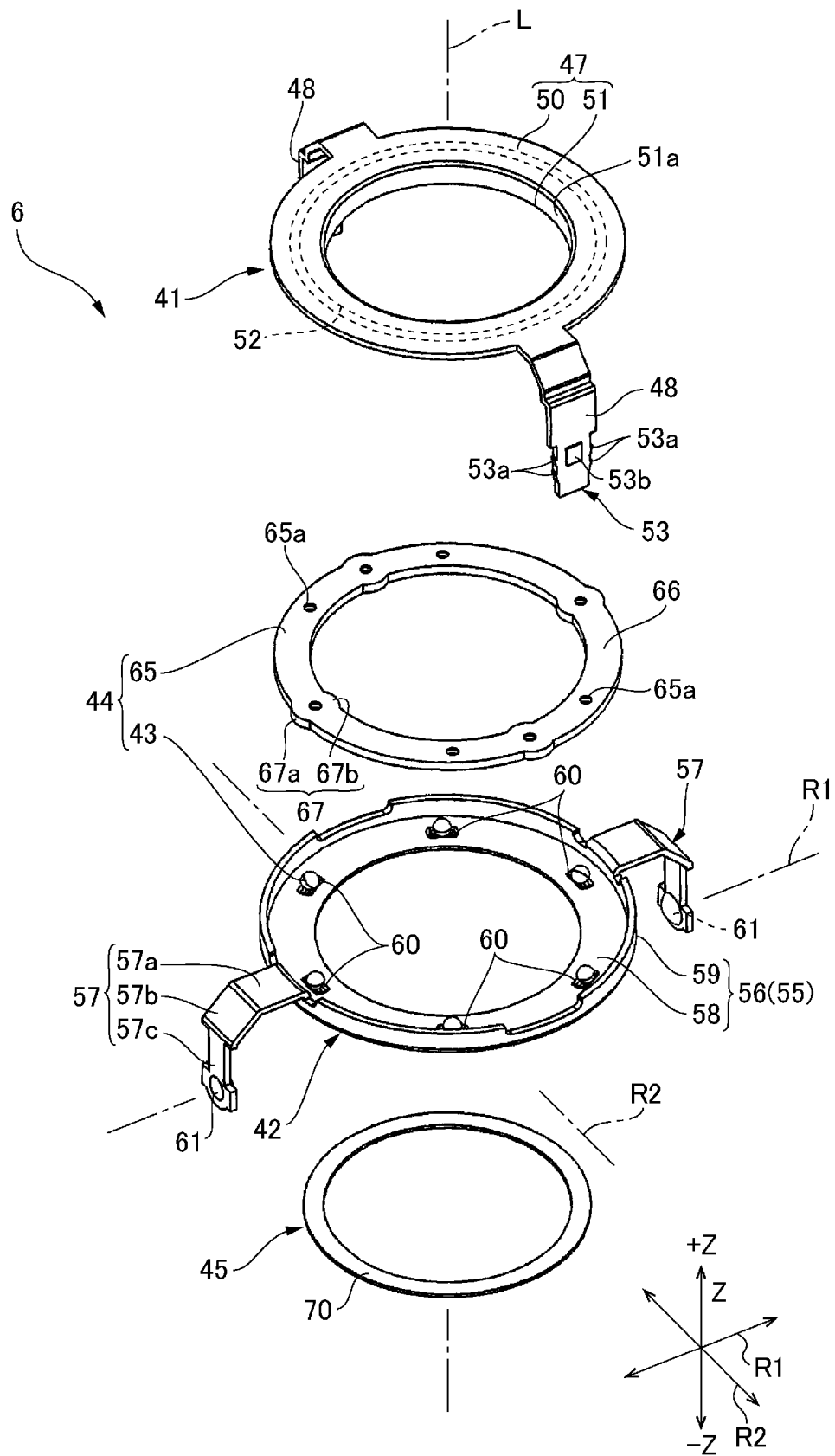
FIG. 10 is an exploded perspective view showing a turning support mechanism.

FIG. 10 is an exploded perspective view showing the turning support mechanism 6. As shown in FIG. 10, the turning support mechanism 6 includes a plate roll 41 which is fixed to the movable body 5, a plate holder 42 provided with a facing part 55 which faces the plate roll 41 in the "Z"-axis direction, a turning mechanism 44 which includes a plurality of spherical bodies 43 capable of rolling in a contacted state with the plate roll 41 and the facing part, and a pressurization mechanism 45 which urges the plate roll 41 and the plate holder 42 in a direction approaching each other.

The plate roll 41 is made of metal. The plate roll 41 is provided with a plate roll ring-shaped part 47 surrounding the optical axis "L" and a pair of plate roll extended parts 48 which are protruded from the plate roll ring-shaped part 47 to both sides in the second axis "R2" direction and are extended in the first direction. The plate roll ring-shaped part 47 is provided with a plate roll ring-shape plate 50 and a bent portion 51 in a cylindrical shape which is bent in the first direction from an end edge on an inner peripheral side of the plate roll 41. As shown in FIG. 8, an end face in the "−Z" direction of the plate roll ring-shape plate 50 is provided with a plate roll ring-shaped groove 52 at a center in a radial direction. The bent portion 51 is provided with a tapered inner circumferential face 51a which is inclined to an outer peripheral side toward an end in the "−Z" direction. The cylindrical tube portion 30 of the movable body protruded part 18 is inserted into the bent portion 51 from the "−Z" direction side and is fitted to the bent portion 51.

As shown in FIG. 10, each of a pair of the plate roll extended parts 48 is provided with a fixing part 53, which is fixed to the movable body 5, in an end portion in the "−Z" direction. The fixing part 53 is provided at both end edges in the circumferential direction with a plurality of protruded parts 53a in a wedge shape whose width in the circumferential direction is enlarged toward the "+Z" direction. Further, the fixing part 53 is provided with a rectangular protruded part 53b on an outer side face in the second axis "R2" direction. A protruding amount in the second axis "R2" direction of the rectangular protruded part 53b is increased toward the "+Z" direction.

The plate holder 42 is, as shown in FIG. 10, provided with a plate holder ring-shaped part 56 surrounding the movable body protruded part 18 and a pair of plate holder extended parts 57 which are protruded from the plate holder ring-shaped part 56 toward both sides in the first axis "R1" direction and are extended in the "−Z" direction. The plate holder ring-shaped part 56 is the facing part 55 which faces the plate roll ring-shaped part 47 in the "Z"-axis direction. The plate holder ring-shaped part 56 is provided with a plate holder ring-shaped plate 58 and a plate holder ring-shaped wall 59 which is extended in the "+Z" direction from an end edge on an outer peripheral side of the plate holder ring-shaped plate 58. An end face in the "+Z" direction of the plate holder ring-shaped plate 58 is provided with a plurality of plate holder circular arc grooves 60 which are separated from each other in the circumferential direction. A plurality of the plate holder circular arc grooves 60 is extended in the circumferential direction, and each of the plate holder circular arc grooves 60 faces the plate roll ring-shaped groove 52. A plurality of the plate holder circular arc grooves 60 is provided at equal angular intervals. In this embodiment, the plate holder ring-shaped plate 58 is provided with six plate holder circular arc grooves 60.

Each of a pair of the plate holder extended parts 57 is provided with a first plate holder extended portion 57a, which is extended from an upper end portion of the plate holder ring-shaped wall 59 in a direction separated from the plate holder ring-shaped part 56 along the first axis "R1" direction, a second plate holder extended portion 57b which is inclined in the "−Z" direction from an end on an outer peripheral side of the first plate holder extended portion 57a toward a direction separated from the plate holder ring-shaped part 56, and a third plate holder extended portion 57c which is extended from an end in the "−Z" direction of the second plate holder extended portion 57b in the "−Z" direction on an outer peripheral side with respect to the movable body 5. As shown in FIG. 8, the third plate holder extended portion 57c of one of the plate holder extended parts 57 faces the fifth side wall 25 of the movable body 5 through a slight gap space in the first axis "R1" direction. The third plate holder extended portion 57c of the other of the plate holder extended parts 57 faces the sixth side wall 26 of the movable body 5 through a slight gap space in the first axis "R1" direction. Further, each of the third plate holder extended portions 57c is provided with a first concave curved face 61 which is recessed to a side of the movable body 5 on a line of the first axis "R1". The first concave curved face 61 structures a first connection mechanism 76 of the gimbal mechanism 7 together with a first support member 81 described below.

As shown in FIG. 10, the turning mechanism 44 includes a plurality of spherical bodies 43 and a retainer 65. The retainer 65 is provided with a plurality of spherical body holding holes 65a each of which holds each of the spherical bodies 43 so as to be capable of rolling. In this embodiment, the turning mechanism 44 includes six spherical bodies 43. Therefore, the retainer 65 is provided with the spherical body holding holes 65a which are capable of holding the six spherical bodies 43. An end portion in the "−Z" direction of each of the spherical bodies 43 is partly inserted into each of the plate holder circular arc grooves 60. The retainer 65 is provided with a ring-shaped retainer main body part 66 in which the spherical body holding holes 65a penetrate through in the "Z"-axis direction and four retainer protruded parts 67 which are protruded on both sides in a radial direction from a plurality of portions in the circumferential direction of the retainer main body part 66. The spherical body 43 is held by the spherical body holding hole 65a and is protruded in the "−Z" direction and in the "+Z" direction from the retainer 65. The spherical body holding hole 65a is provided with a curved surface shape in a circular arc shape whose inside diameter dimension is decreased toward the "+Z" direction. Therefore, the respective spherical bodies 43 are covered by the retainer 65 from the "+Z" direction side.

Each of the retainer protruded parts 67 is provided with an outer side protruded part 67a protruded to an outer side in the radial direction and an inner side protruded part 67b protruded to an inner side in the radial direction. Four retainer protruded parts 67 are provided at intervals of 90°. In a state that the retainer 65 is disposed between the plate holder ring-shaped part 56 and the plate roll ring-shaped part 47, the plate holder ring-shaped wall 59 of the plate holder ring-shaped part 56 is abutted with the outer side protruded part 67a from an outer side in the radial direction. In other words, the plate holder ring-shaped wall 59 is an abutting part which is abutted with the retainer protruded part 67 in the radial direction. Further, the bent portion 51 of the plate roll ring-shaped part 47 is abutted with the inner side protruded part 67b from an inner side in the radial direction. In other words, the bent portion 51 of the plate roll ring-shaped part 47 is an abutting part which is abutted with the retainer protruded part 67 in the radial direction. The retainer 65 is positioned in the radial direction by abutting the retainer protruded part 67 with the plate holder ring-shaped part 56 and the plate roll ring-shaped part 47.

The pressurization mechanism 45 includes a plate spring 70 which is fixed to the plate roll ring-shaped part 47. The plate spring 70 is formed in a circular ring shape. The plate spring 70 is formed in a tapered shape whose inner peripheral side is inclined toward the "+Z" direction. As shown in FIG. 8, an inner circumferential edge of the plate spring 70 is fixed to an end face in the "−Z" direction of the bent portion 51 of the plate roll ring-shaped part 47. An outer peripheral side portion of the plate spring 70 is abutted with the plate holder ring-shaped part 56 from the "−Z" direction side in a state that the outer peripheral side portion is resiliently bent in the "−Z" direction. More specifically, the plate holder ring-shaped part 56 is provided with a thin thickness portion 56a which is recessed in the "+Z" direction in an end edge portion on the inner peripheral side. An outer peripheral side portion of the plate spring 70 is abutted with the thin thickness portion 56a from a side in the "−Z" direction in a state that the outer peripheral side portion is elastically deformed in a direction separated from the plate roll ring-shaped part 47. Therefore, the plate spring 70 urges the plate holder 42 (plate holder ring-shaped part 56) toward the plate roll 41 (plate roll ring-shaped part 47) by its own elastic restoration force.

In this embodiment, as shown in FIG. 9, the movable body 5 is provided with a plate roll fixing hole 72, into which the fixing part 53 of each of a pair of the plate roll extended parts 48 is inserted, on each of both end portions in the second axis "R2" direction of the movable body main body part 17. The plate roll fixing hole 72 is provided in the imaging module holder 16. The plate roll fixing holes 72 are provided in parallel to the seventh side wall 27 and the eighth side wall 28 and are extended in the "−Z" direction.

The turning support mechanism 6 is fixed to the movable body 5 by press-fitting the fixing part 53 of each of the plate roll extended parts 48 of the plate roll 41 into each of the plate roll fixing holes 72. When the fixing part 53 is to be inserted into the plate roll fixing hole 72, the movable body protruded part 18 is inserted into a center hole of the plate roll ring-shaped plate 50, and the movable body protruded part 18 is fitted to the bent portion 51. As a result, the plate roll 41 is coaxially positioned with the movable body protruded part 18. In other words, the plate roll 41 is positioned with the optical axis "L" as a reference. Further, when the fixing part 53 of each of the plate roll extended parts 48 is press-fitted to each of the plate roll fixing holes 72, the protruded parts 53a and the protruded part 53b of the fixing part 53 are plastically deformed to be in a crushed state. As a result, the plate roll 41 and the movable body 5 are fixed to each other. When the plate roll 41 and the movable body 5 are fixed to each other, the movable body 5 is integrally turnable with the plate roll 41 around the optical axis "L".

Gimbal Mechanism

Figure 11:
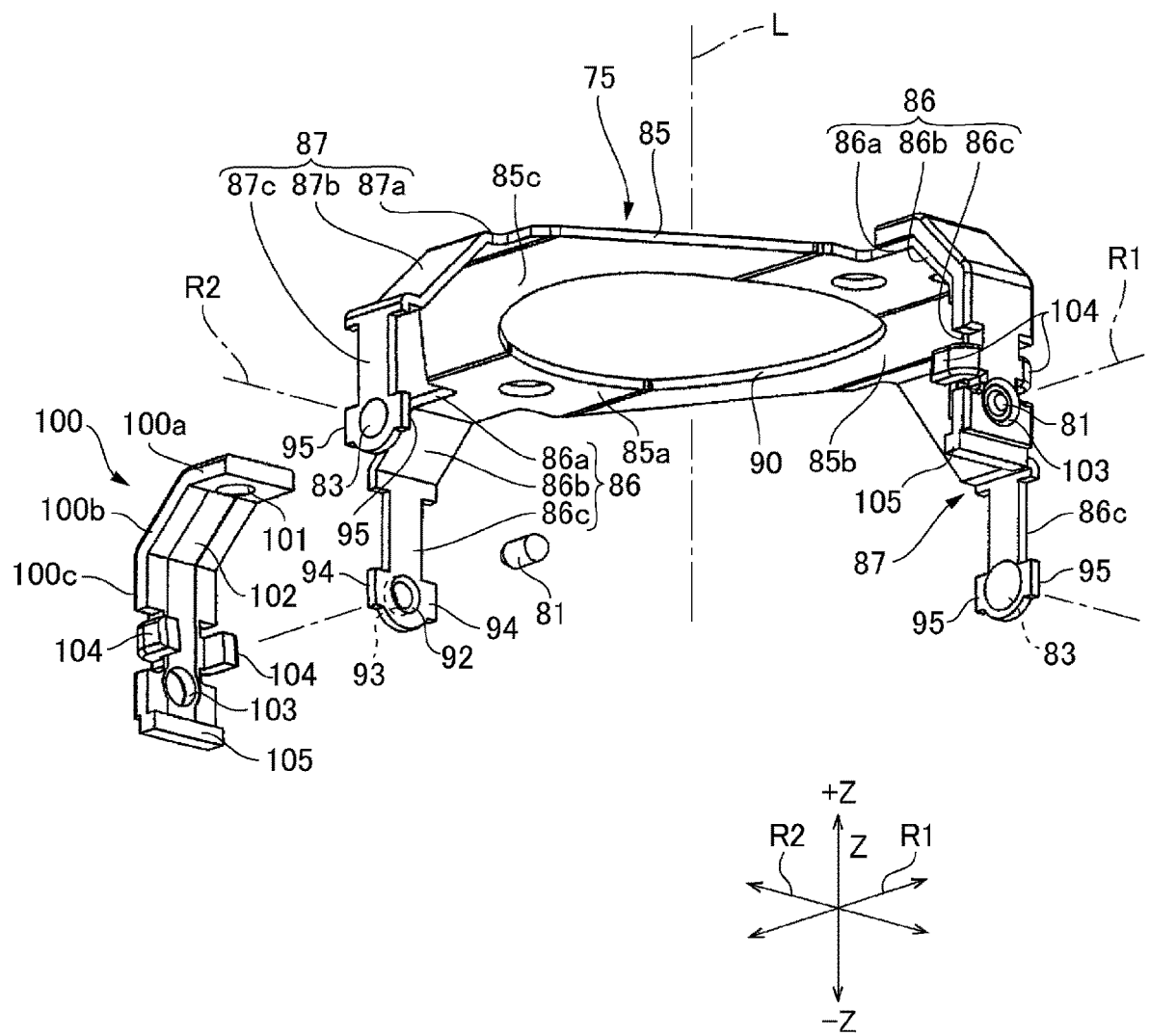
FIG. 11 is an exploded perspective view showing a gimbal frame, a reinforcement member and a first support member.

FIG. 11 is an exploded perspective view showing a gimbal frame, a reinforcement member and a first support member. As shown in FIG. 4, the gimbal mechanism 7 includes a gimbal frame 75 and a first connection mechanism 76 which turnably connects the gimbal frame 75 with the plate holder 42 around the first axis "R1". Further, as shown in FIG. 5, the gimbal mechanism 7 includes a second connection mechanism 77 which turnably connects the gimbal frame 75 with the fixed body 8 around the second axis "R2". The first connection mechanism 76 includes a first support member 81, which is protruded from the gimbal frame 75 to a side of the plate holder 42 on the first axis "R1", and a first concave curved face 61 which is provided in the plate holder 42 and is turnably brought into contact with a tip end of the first support member 81. The second connection mechanism 77 includes a second support member 82, which is protruded from the fixed body 8 to a side of the gimbal frame 75 on the second axis "R2", and a second concave curved face 83 which is provided in the gimbal frame 75 and is brought into contact with a tip end of the second support member 82. As shown in FIG. 11, a reinforcement member 100 is fixed to the gimbal frame 75 for reinforcing a portion of the gimbal frame 75 where the first axis "R1" is passed.

Gimbal Frame

The gimbal frame 75 is structured of a plate spring made of metal. As shown in FIG. 9, the gimbal frame 75 is provided with a gimbal frame main body part 85 located in the "+Z" direction with respect to the plate holder 42, a pair of first gimbal frame extended parts 86 which are protruded from the gimbal frame main body part 85 to both sides in the first axis "R1" direction and are extended in the "−Z" direction, and a pair of second gimbal frame extended parts 87 which are protruded from the gimbal frame main body part 85 to both sides in the second axis "R2" direction and are extended in the "−Z" direction. The gimbal frame main body part 85 is provided with a center plate portion 85a in a substantially rectangular shape which is extended in the first axis "R1" direction, a first inclined plate portion 85b which is inclined in the "+Z" direction from one side ("−Y" direction side) in the second axis "R2" direction of the center plate portion 85a, and a second inclined plate portion 85c which is inclined in the "+Z" direction from the other side ("+Y" direction side) in the second axis "R2" direction of the center plate portion 85a. Further, the gimbal frame main body part 85 is provided at its center with an opening part 90 which penetrates through in the "Z"-axis direction. The movable body protruded part 18 is inserted into the opening part 90.

A pair of the first gimbal frame extended parts 86 is located on the outer peripheral side with respect to the plate holder 42. As shown in FIG. 11, each of a pair of the first gimbal frame extended parts 86 is provided with a first extended portion 86a of the first gimbal frame extended part 86 which is extended in the first axis "R1" direction so as to be separated from the gimbal frame main body part 85, a second extended portion 86b of the first gimbal frame extended part 86 which is inclined in the "−Z" direction from a tip end of the first extended portion 86a of the first gimbal frame extended part 86 toward a direction separated from the gimbal frame main body part 85 in the first axis "R1" direction, and a third extended portion 86c of the first gimbal frame extended part 86 which is extended in the "−Z" direction from an end in the "−Z" direction of the second extended portion 86b of the first gimbal frame extended part 86 on the outer peripheral side with respect to the plate holder 42.

The first extended portion 86a of the first gimbal frame extended part 86 is extended from the center plate portion 85a in the first axis "R1" direction. The third extended portion 86c of the first gimbal frame extended part 86 is provided with a gimbal frame extended part through-hole 92 which penetrates through in the first axis "R1" direction. Further, the third extended portion 86c of the first gimbal frame extended part 86 is provided with a support member fixing tube part 93 which is protruded from an opening edge of the gimbal frame extended part through-hole 92 toward an opposite side (reinforcement member side) to the movable body 5 in the first axis "R1" direction. In addition, the first gimbal frame extended part 86 is provided with a pair of protruded parts 94 of the first gimbal frame extended part 86 which are protruded from both sides in the circumferential direction of the third extended portion 86c of the first gimbal frame extended part 86 with the gimbal frame extended part through-hole 92 interposed therebetween.

In this embodiment, the first support member 81 is formed in a cylindrical shape and is extended in the first axis "R1" direction on the first axis "R1". An end part on the movable body 5 side of the first support member 81 is provided with a hemispherical face. The first support member 81 is inserted into and held by the support member fixing tube part 93. An end part on the movable body 5 side of the first support member 81 is protruded to the movable body 5 side from the third extended portion 86c of the first gimbal frame extended part 86.

A pair of the second gimbal frame extended parts 87 is located on the outer peripheral side with respect to the movable body 5. Each of a pair of the second gimbal frame extended parts 87 is provided with a first extended portion 87a of the second gimbal frame extended parts 87, which is extended in the second axis "R2" direction so as to be separated from the gimbal frame main body part 85, a second extended portion 87b of the second gimbal frame extended parts 87, which is inclined in the "−Z" direction from a tip end of the first extended portion 87a of the second gimbal frame extended parts 87 toward a direction separated from the gimbal frame main body part 85 in the second axis "R2" direction, and a third extended portion 87c of the second gimbal frame extended parts 87 which is extended in the "−Z" direction from an end in the "−Z" direction of the second extended portion 87b of the second gimbal frame extended parts 87 on the outer peripheral side with respect to the movable body 5. The first extended portion 87a of one of the second gimbal frame extended parts 87 which is located in the "−Y" direction is extended in the second axis "R2" direction from an end edge on the outer peripheral side of the first inclined plate portion 85b. The first extended portion 87a of the other of the second gimbal frame extended parts 87 which is located in the "+Y" direction is extended in the second axis "R2" direction from an end edge on the outer peripheral side of the second inclined plate portion 85c. The third extended portion 87c of each of the second gimbal frame extended parts 87 is provided with a second concave curved face 83 which is recessed in the second axis "R2" direction. Further, the second gimbal frame extended part 87 is provided with a pair of protruded parts 95 which are protruded in the circumferential direction from both sides in the circumferential direction of the third extended portion 87c of the second gimbal frame extended part 87 with the second concave curved face 83 interposed therebetween. In this embodiment, the second concave curved face 83 structures the second connection mechanism 77 together with a second support member 82 of the fixed body 8 described below.

Reinforcement Member

As shown in FIG. 11, the reinforcement member 100 is provided with a first reinforcement portion 100a which is located in the "+Z" direction of the first extended portion 86a of the first gimbal frame extended part 86, a second reinforcement portion 100b which is extended from an end on the outer peripheral side of the first reinforcement portion 100a along the second extended portion 86b of the first gimbal frame extended part 86, and a third reinforcement portion 100c which is extended from an end in the "−Z" direction of the second extended portion 86b of the first gimbal frame extended part 86 along the third extended portion 86c of the first gimbal frame extended part 86. The third reinforcement portion 100c is located on an outer side in the radial direction of the third extended portion 86c of the first gimbal frame extended part 86. In a state that the first gimbal frame extended part 86 and the reinforcement member 100 are overlapped with each other, a thickness of the reinforcement member 100 in the laminated direction is thicker than that of the first gimbal frame extended part 86. Rigidity of the reinforcement member 100 is higher than rigidity of the first gimbal frame extended part 86. The reinforcement member 100 is made of resin.

The reinforcement member 100 is provided with an adhesive injection hole 101 which penetrates through the first reinforcement portion 100a in the "Z"-axis direction, and a communication groove 102 which is extended on a face on the first gimbal frame extended part 86 side along the first reinforcement portion 100a, the second reinforcement portion 100b and the third reinforcement portion 100c and is communicated with the adhesive injection hole 101. In addition, the third reinforcement portion 100c is provided with a reinforcement member through-hole 103 which penetrates in the first axis "R1" direction and is communicated with the gimbal frame extended part through-hole 92. The reinforcement member through-hole 103 has an inside diameter dimension so that the support member fixing tube part 93 of the first gimbal frame extended part 86 is capable of being inserted.

As shown in FIG. 8, the reinforcement member 100 is attached to the first gimbal frame extended part 86 by inserting the support member fixing tube part 93 into the reinforcement member through-hole 103 of the third reinforcement portion 100c. Therefore, the first support member 81 inserted into the support member fixing tube part 93 is supported by the first gimbal frame extended part 86 and the reinforcement member 100. In this state, when an adhesive is injected into the adhesive injection hole 101, the adhesive flows the communication groove 102 and exists between the reinforcement member 100 and the first gimbal frame extended part 86. The reinforcement member 100 and the first gimbal frame extended part 86 are fixed to each other by the adhesive of the communication groove 102.

The reinforcement member 100 is, as shown in FIGS. 7 and 11, provided with a pair of first reinforcement member protruded parts 104 which are, when the reinforcement member 100 is attached to the first gimbal frame extended part 86, protruded toward the movable body 5 side on both sides of the first gimbal frame extended part 86 in the circumferential direction around the optical axis "L". A pair of the first reinforcement member protruded parts 104 is located in the "+Z" direction with respect to a pair of the protruded parts 94 of the first gimbal frame extended part 86 provided in the first gimbal frame extended part 86. When viewed in the "Z"-axis direction, a pair of the first reinforcement member protruded parts 104 and a pair of the protruded parts 94 of the first gimbal frame extended part 86 are overlapped with each other. In addition, the reinforcement member 100 is provided with a second reinforcement member protruded part 105 which is protruded toward the movable body 5 side in the "−Z" direction with respect to the first gimbal frame extended part 86. When viewed in the "Z"-axis direction, the second reinforcement member protruded part 105 and the third extended portion 86c of the first gimbal frame extended part 86 are overlapped with each other.

First Connection Mechanism

In this embodiment, a pair of the first gimbal frame extended parts 86 is located on the outer peripheral side with respect to the movable body 5. A pair of the plate holder extended parts 57 is located between a pair of the first gimbal frame extended parts 86 and the movable body 5. Further, the third extended portion 86c of the first gimbal frame extended part 86 which holds the first support member 81 and the third plate holder extended portion 57c provided with the first concave curved face 61 face each other on the first axis "R1". The first connection mechanism 76 is structured so that a tip end of the first support member 81 protruded toward the movable body 5 side from the first gimbal frame extended part 86 is brought into contact with the first concave curved face 61. In this embodiment, the first support member 81 and the first concave curved face 61 are brought into point-contact with each other. As a result, the turning support mechanism 6 is turnably supported by the gimbal frame 75 through the first connection mechanism 76. Therefore, the movable body 5 which is supported by the turning support mechanism 6 is turnably supported by the gimbal mechanism 7 around the first axis "R1".

In a state that the movable body 5 and the turning support mechanism 6 are supported by the gimbal mechanism 7, the gimbal frame main body part 85, the plate roll ring-shaped part 47 and the plate holder ring-shaped part 56 are located in the "+Z" direction with respect to the movable body main body part 17 and on the outer peripheral side with respect to the movable body protruded part 18. The plate roll ring-shaped part 47 is located between the gimbal frame main body part 85 and the movable body main body part 17 in the "Z"-axis direction. The plate holder ring-shaped part 56 is located between the gimbal frame main body part 85 and the movable body main body part 17 in the "Z"-axis direction. Further, the plate roll ring-shaped part 47 and the plate holder ring-shaped part 56 are located in the "+Z" direction with respect to the first axis "R1" and the second axis "R2". In addition, the gimbal frame main body part 85, the plate roll ring-shaped part 47 and the plate holder ring-shaped part 56 are located in the "+Z" direction with respect to the imaging element 3.

Fixed Body

Figure 12:
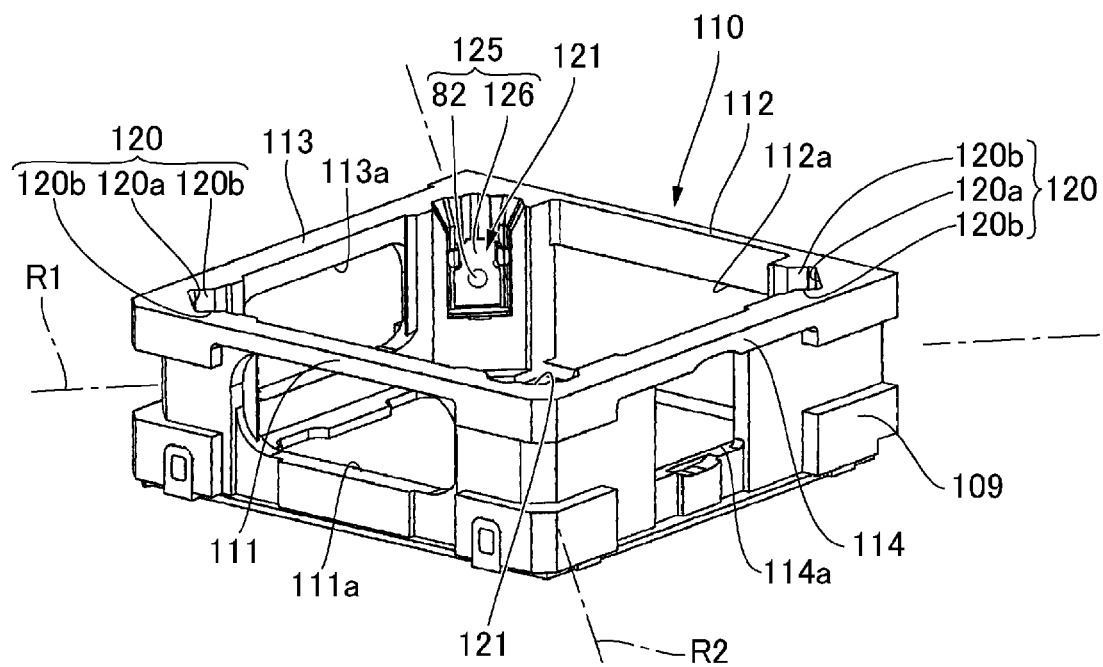
FIG. 12 is a perspective view showing a case and a gimbal frame receiving member.
Figure 12:
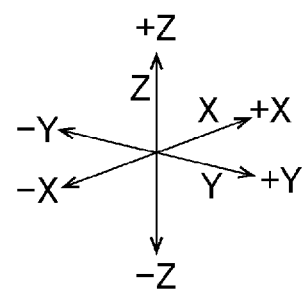
Figure 13:
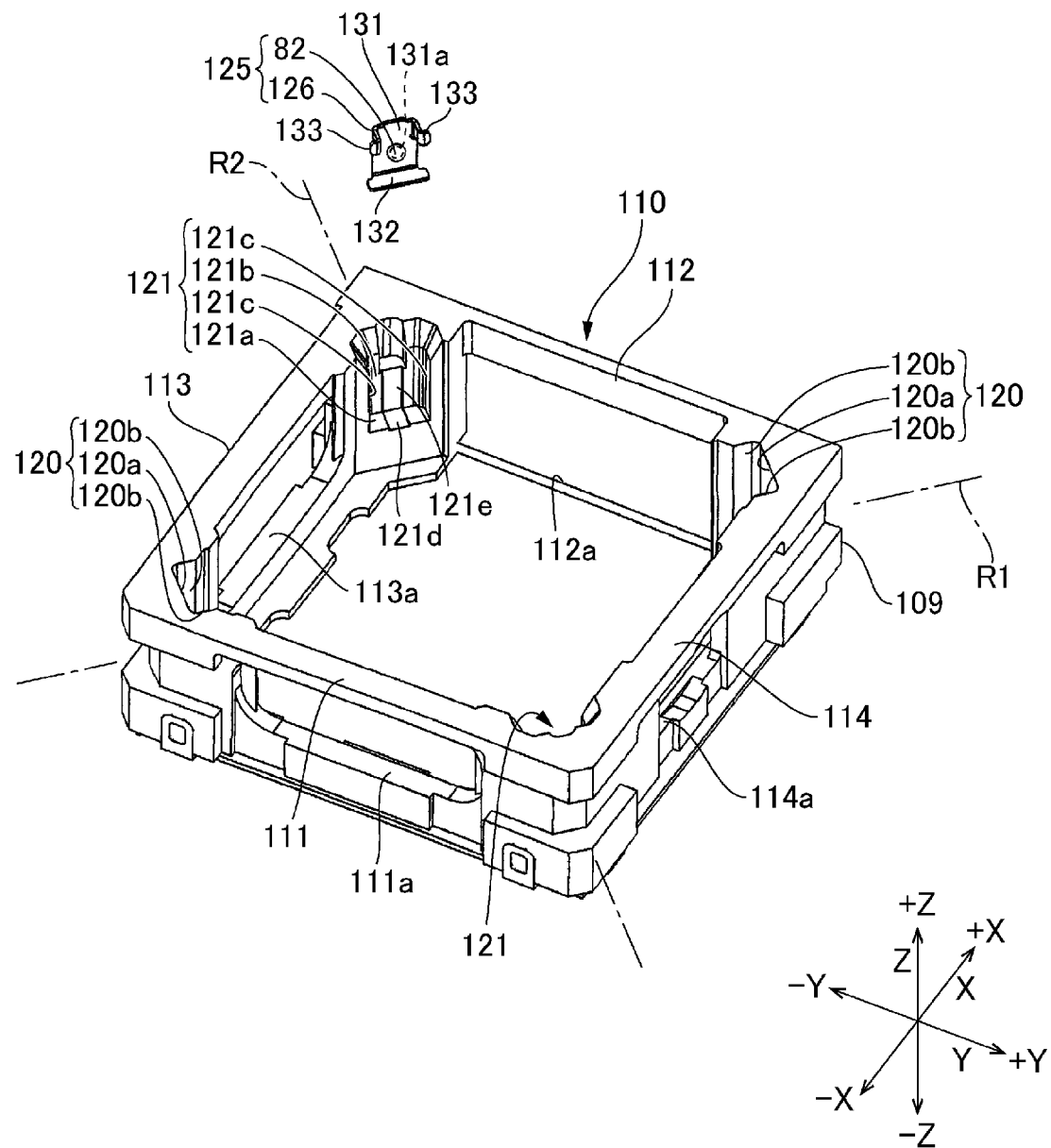
FIG. 13 is an exploded perspective view showing a case and a gimbal frame receiving member.

FIG. 12 is a perspective view showing a case and a gimbal frame receiving member which structure the fixed body 8. FIG. 13 is an exploded perspective view showing a case and a gimbal frame receiving member. As shown in FIG. 1, the fixed body 8 includes a case 109 made of resin. The case 109 is provided with a frame part 110 which surrounds the movable body 5, the turning support mechanism 6 and the gimbal frame 75 from the outer peripheral side. The frame part 110 is formed in a rectangular shape. The frame part 110 is, as shown in FIG. 12, provided with a first frame portion 111 and a second frame portion 112 facing each other in the "X" direction, and a third frame portion 113 and a fourth frame portion 114 facing each other in the "Y" direction. The first frame portion 111 is located in the "−X" direction with respect to the second frame portion 112. The third frame portion 113 is located in the "−Y" direction with respect to the fourth frame portion 114.

The first frame portion 111 is provided with a first coil fixing hole 111*a*. As shown in FIG. 2, a first coil 115 is fixed to the first coil fixing hole 111*a*. The third frame portion 113 is provided with a second coil fixing hole 113*a*. A second coil 116 is fixed to the second coil fixing hole 113*a*. Each of the first coil 115 and the second coil 116 is an air core coil in an elliptical shape which is long in the circumferential direction. As shown in FIG. 12, the fourth frame portion 114 is provided with a third coil fixing hole 114*a*. As shown in FIG. 1, a third coil 117 is disposed in the third coil fixing hole 114*a*. The third coil 117 is an air core coil which is long in the "Z"-axis direction. In this embodiment, the first coil 115, the second coil 116 and the third coil 117 are electrically connected with the flexible printed circuit board 15. The flexible printed circuit board 15 is extended along outer peripheral faces of the fourth frame portion 114, the first frame portion 111 and the third frame portion 113 of the frame part 110 in this order. As shown in FIG. 12, the second frame portion 112 is provided with an opening part 112*a*. A flexible printed circuit board (not shown) which is extended from the imaging module 4 of the movable body 5 is extended in the "+X" direction with respect to the frame part 110 through the opening part 112*a*.

As shown in FIGS. 4 and 12, each of diagonal portions of the frame part 110 in the first axis "R1" direction is provided with a groove part 120 which is recessed to an outer side in the radial direction and is extended in the "Z"-axis direction. As shown in FIG. 12, the groove part 120 is defined by a bottom face 120*a* extended in the "Z"-axis direction and a pair of side faces 120*b* which are extended to the inner peripheral side from both ends in the circumferential direction around the optical axis "L" of the bottom face 120*a*.

As shown in FIGS. 5 and 12, each of diagonal portions of the frame part 110 in the second axis "R2" direction is fixed with a second support member 82 which is protruded to a side of the gimbal frame 75 on the second axis "R2". The second support member 82 is a spherical body. More specifically, as shown in FIG. 13, each of the diagonal portions in the second axis "R2" direction of the frame part 110 is provided with a recessed part 121 which is recessed to an outer side in the radial direction. Each of the recessed parts 121 is defined by a bottom face 121*a* extended in the second axis "R2" direction, a rear face 121*b* which is extended in the "+Z" direction from an outer peripheral end of the bottom face 121*a*, and a pair of side faces 121*c* which are extended in the "+Z" direction from both ends in the circumferential direction around the optical axis "L" of the bottom face 121*a*. The bottom face 121*a* is provided with a first groove 121*d* extended in the second axis "R2" direction with a constant width in its center portion in the circumferential direction. The rear face 121*b* is provided with a second groove 121*e* extended in the "Z"-axis direction with a constant width in its center portion in the circumferential direction. The first groove 121*d* and the second groove 121*e* are communicated with each other.

As shown in FIG. 12, the gimbal frame receiving member 125 is fixed to each of the recessed parts 121. As shown in FIG. 13, the gimbal frame receiving member 125 includes the second support member 82 and a thrust receiving member 126 to which the second support member 82 is fixed. The thrust receiving member 126 and the second support member 82 are made of metal. As shown in FIGS. 7 and 13, the thrust receiving member 126 is provided with a first plate part 131 in a plate shape extended in the "Z"-axis direction, a second plate part 132 which is bent at a substantially right angle from an end part in the "−Z" direction of the first plate part 131 and is extended to an inner side in the radial direction, and a pair of third plate parts 133 which are bent at a substantially right angle from both sides in the circumferential direction in an end part in the "+Z" direction of the first plate part 131 and are extended to an inner side in the radial direction. End parts on the inner peripheral side of a pair of the third plate parts 133 are bent in directions separated from each other in the circumferential direction. A second support member fixing hole 131*a* is provided in the first plate part 131. The second support member fixing hole 131*a* is located between the second plate part 132 and a pair of the third plate parts 133 in the "Z"-axis direction. The second support member 82 is fixed to the first plate part 131 by welding in a state that a part on the outer peripheral side of the second support member 82 is partly fitted to the second support member fixing hole 131*a*. The second support member 82 is protruded to the inner peripheral side from the first plate part 131.

When the gimbal frame receiving member 125 is to be inserted to the recessed part 121 of the case 109, as shown in FIG. 12, a pair of the third plate parts 133 of the thrust receiving member 126 is abutted with a pair of the side faces 121*c* of the recessed part 121. As a result, the second support member 82 is positioned in the circumferential direction around the optical axis "L". Further, the second plate part 132 of the thrust receiving member 126 is abutted with the bottom face 121*a* of the recessed part 121. As a result, the second support member 82 is positioned in the "Z"-axis (optical axis "L") direction. The thrust receiving member 126 is fixed to the recessed part 121 by an adhesive applied to the first groove 121*d* and the second groove 121*e*. When the thrust receiving member 126 is fixed to the recessed part 121, the second support member 82 is located on the second axis "R2" line and is protruded to the inner peripheral side from the first plate part 131 of the thrust receiving member 126 which is fixed to the frame part 110.

Second Connection Mechanism

When the movable body 5 is to be turnably supported around the second axis "R2" line by the gimbal mechanism 7, the gimbal frame 75 by which the movable body 5 and the turning support mechanism 6 are supported is disposed on an inner side of the frame part 110. Further, as shown in FIG. 4, the first gimbal frame extended parts 86 and the reinforcement members 100 are inserted to the groove parts 120 provided in the diagonal portions of the frame part 110. In addition, as shown in FIG. 5, the second support member 82 (spherical body) disposed in the diagonal portion of the frame part 110 and the third extended portion 87c of the second gimbal frame extended part 87 having the second concave curved face 83 are faced each other. In addition, a tip end portion of the second support member 82 is inserted to the second concave curved face 83 and is brought into contact with the second concave curved face 83. Further, as shown in FIG. 7, a pair of the protruded parts 95 of the second gimbal frame extended part 87 is inserted between a pair of the third plate parts 133 and the second plate part 132 of the thrust receiving member 126. In this manner, the second connection mechanism 77 is structured and thus, the turning support mechanism 6 is turnably supported by the gimbal mechanism 7 around the second axis "R2". In other words, the turning support mechanism 6 is turnably supported around the first axis "R1" and is turnably supported around the second axis "R2" by the gimbal mechanism 7. Therefore, the movable body 5 supported by the turning support mechanism 6 is also turnably supported around the first axis "R1" and is also turnably supported around the second axis "R2" by the gimbal mechanism 7.

In this embodiment, the gimbal frame 75 is a plate spring and thus, the second gimbal frame extended part 87 is elastically deformable in the second axis "R2" direction. Therefore, when the second support member 82 and the second concave curved face 83 of the second gimbal frame extended part 87 are to be brought into contact with each other, the second gimbal frame extended part 87 is resiliently bent to the inner peripheral side and is brought into contact with the second support member 82. As a result, the second gimbal frame extended part 87 is elastically brought into contact with the second support member 82 from the inner peripheral side by an elastic restoration force toward the outer peripheral side. Therefore, release of connection between the second gimbal frame extended part 87 and the frame part 110 can be prevented or suppressed.

Shake Correction Magnetic Drive Mechanism and Rolling Correction Magnetic Drive Mechanism In a state that the movable body 5 and the turning support mechanism 6 are supported by the gimbal mechanism 7, the first magnet 35 fixed to the first side wall 21 of the movable body 5 and the first coil 115 face each other through a gap space in the "X" direction. The first magnet 35 and the first coil 115 structure the second shake correction magnetic drive mechanism 12. Further, the second magnet 36 fixed to the third side wall 23 of the movable body 5 and the second coil 116 face each other through a gap space in the "Y" direction. The second magnet 36 and the second coil 116 structure the first shake correction magnetic drive mechanism 11. Therefore, the movable body 5 is turned around the "Y"-axis by supplying power to the first coil 115. Further, the movable body 5 is turned around the "X"-axis by supplying power to the second coil 116. The shake correction magnetic drive mechanism 10 combines turning around the "Y"-axis of the movable body 5 by the first shake correction magnetic drive mechanism 11 and turning around the "X"-axis of the movable body 5 by the second shake correction magnetic drive mechanism 12 to turn the movable body 5 around the first axis "R1" and around the second axis "R2".

Further, in a state that the movable body 5 is disposed on the inner peripheral side with respect to the frame part 110, the third magnet 37 fixed to the fourth side wall 24 of the movable body 5 and the third coil 117 face each other through a gap space in the "Y" direction. The third magnet 37 and the third coil 117 structure the rolling correction magnetic drive mechanism 13. Therefore, the movable body 5 is turned around the optical axis "L" by supplying power to the third coil 117.

In this embodiment, as shown in FIGS. 4 and 5, a gap space "D1" in the "Z"-axis direction between the second gimbal frame extended part 87 and the plate roll extended part 48 is larger than a gap space "D2" in the "Z"-axis direction between the first gimbal frame extended part 86 and the plate holder extended part 57. Therefore, when the turning support mechanism 6 is turned around the first axis "R1" by the gimbal mechanism 7, the turning support mechanism 6 is restrained from being brought into contact with the second gimbal frame extended part 87.

Further, in a state that the gimbal frame 75 is connected with the frame part 110 through the second connection mechanism 77, a pair of the first gimbal frame extended parts 86 of the gimbal frame 75 and the reinforcement members 100 are disposed on inner sides of the groove parts 120 provided in the diagonal portions in the first axis "R1" direction of the frame part 110. In this embodiment, as shown in FIG. 3, each of a pair of the side faces 120b of the groove part 120 faces the reinforcement member 100 with a first predetermined space interposed therebetween in the circumferential direction around the optical axis "L". A pair of the side faces 120b of the groove part 120 functions as a moving range restriction part 145 which is capable of abutting with the reinforcement member 100 when the gimbal frame 75 is displaced in the circumferential direction to restrict a moving range of the gimbal frame 75. Further, as shown in FIGS. 3 and 4, the bottom face 120a of the groove part 120 which is located on an outer side in the radial direction with respect to the reinforcement member 100 faces the reinforcement member 100 through a second space in the first axis "R1" direction. The bottom face 120a of the groove part 120 functions as a turning range restriction part 146 which is capable of abutting with the reinforcement member 100 when the gimbal frame 75 is turned around the second axis "R2" to restrict a turning range of the gimbal frame 75.

In this embodiment, as shown in FIGS. 2 and 6, a first magnetic plate 141 in a rectangular shape is disposed on the outer peripheral side of the first coil 115. A second magnetic plate 142 in a rectangular shape is disposed on the outer peripheral side of the second coil 116. The first magnetic plate 141 faces the first magnet 35 of the movable body 5 and structures a magnetic spring for returning the movable body 5 to a turning reference position in a turning direction around the "Y"-axis. The second magnetic plate 142 faces the second magnet 36 of the movable body 5 and structures a magnetic spring for returning the movable body 5 to a turning reference position in a turning direction around the "X"-axis. Further, as shown in FIGS. 1 and 6, a third magnetic plate 143 in a rectangular shape is disposed on the outer peripheral side of the third coil 117. The third magnetic plate 143 faces the third magnet 37 of the movable body 5 and structures a magnetic spring for returning the movable body 5 to a turning reference position in a turning direction around the optical axis "L".

Operations and Effects

According to this embodiment, the turning support mechanism 6 which turnably supports the movable body 5 around the optical axis "L" is turnably supported by the gimbal mechanism 7 around the first axis "R1" and around the second axis "R2" intersecting the optical axis "L". Therefore, the turning support mechanism 6 is capable of turning around the first axis "R1" and around the second axis "R2" together with the movable body 5. Therefore, even when the movable body 5 is turned around the first axis "R1" or around the second axis "R2", the turning axis of the movable body 5 by the turning support mechanism 6 and the optical axis "L" of the movable body 5 are coincided with each other. Accordingly, in a case that the movable body 5 is turning around the first axis "R1" or around the second axis "R2", when the rolling correction magnetic drive mechanism 13 is driven to turn the movable body 5, the movable body 5 is turned around the optical axis "L".

In this embodiment, the turning support mechanism 6 which supports the movable body 5 is supported by the gimbal frame 75 through the first connection mechanism 76. Therefore, in comparison with a structure that the gimbal frame 75 supports only the movable body 5 through the first connection mechanism 76, a large load is applied to a portion of the gimbal frame 75 structuring the first connection mechanism 76 (portion of the gimbal frame where the first axis "R1" is passed and its periphery). Further, when the gimbal frame 75 is deformed due to a load from the first connection mechanism 76, there may be occurred that the first support member 81 and the first concave curved face 61 of the plate holder 42 are separated from each other and the plate holder 42 is unable to be turnably supported by the gimbal frame 75. In order to prevent such a problem, the gimbal frame 75 is fixed with the reinforcement member 100 for reinforcing a portion of the gimbal frame 75 where the first axis "R1" is passed. Therefore, deformation of the gimbal frame 75 can be prevented or suppressed. Accordingly, a situation can be avoided that the plate holder 42 is unable to be turnably supported by the gimbal frame 75.

Further, in this embodiment, the gimbal frame 75 is provided with the gimbal frame main body part 85 located in the "+Z" direction of the turning support mechanism 6 and a pair of the first gimbal frame extended parts 86 which are protruded from the frame main body part 85 to both sides in the first axis "R1" direction and are extended in the "−Z" direction. A pair of the first gimbal frame extended parts 86 is located on the outer peripheral side with respect to the movable body 5. Further, each of a pair of the first gimbal frame extended parts 86 is provided with the first extended portion 86a of the first gimbal frame extended part 86 which is extended in a direction separated from the frame main body part in the first axis "R1" direction, the second extended portion 86b of the first gimbal frame extended part 86 which is inclined in a direction separated from the frame main body part toward the "−Z" direction from a tip end of the first extended portion 86a of the first gimbal frame extended part 86, and the third extended portion 86c of the first gimbal frame extended part 86 which is extended from an end in the "−Z" direction of the second extended portion 86b of the first gimbal frame extended part 86 in the "−Z" direction on the outer peripheral side with respect to the turning support mechanism 6. The first support member 81 is protruded to a side of the movable body 5 from the third extended portion 86c of the first gimbal frame extended part 86. On the other hand, the reinforcement member 100 is fixed to each of the first gimbal frame extended parts 86. The reinforcement member 100 is provided with the first reinforcement portion 100a, which is located in the "+Z" direction of the first extended portion 86a of the first gimbal frame extended part 86, the second reinforcement portion 100b which is extended along the second extended portion 86b of the first gimbal frame extended part 86 from an end on the outer peripheral side of the first reinforcement portion 100a, and the third reinforcement portion 100c which is extended along the third extended portion 86c of the first gimbal frame extended part 86 from an end in the "−Z" direction of the second extended portion 86b of the first gimbal frame extended part 86. Therefore, each of a pair of the first gimbal frame extended parts 86 can be prevented or suppressed from deforming in a direction separated from each other by the reinforcement member 100.

In addition, in this embodiment, a thickness of the reinforcement member 100 in a laminated direction formed by overlapping the first gimbal frame extended part 86 with the reinforcement member 100 is thicker than that of the first gimbal frame extended part 86. Therefore, the reinforcement member 100 is easily structured of a member whose rigidity is higher than that of the first gimbal frame extended part 86.

Further, in this embodiment, the third extended portion 86c of the first gimbal frame extended part 86 is provided with the gimbal frame extended part through-hole 92 penetrating in the first axis "R1" direction and the support member fixing tube part 93 which is protruded from an opening edge of the gimbal frame extended part through-hole 92 in the third extended portion 86c of the first gimbal frame extended part 86 to an opposite side to the movable body 5. On the other hand, the third reinforcement portion 100c of the reinforcement member 100 is provided with the reinforcement member through-hole 103 which is penetrated in the first axis "R1" direction to be communicated with the gimbal frame extended part through-hole 92 and into which the support member fixing tube part 93 is inserted. The first support member 81 is held by the support member fixing tube part 93 and is protruded from the third extended portion 86c of the first gimbal frame extended part 86. Therefore, the first support member 81 is held by the first gimbal frame extended part 86 and the reinforcement member 100. Further, the first support member 81 is inserted into the support member fixing tube part 93 which is extended in the first axis "R1" direction and thus, the first support member 81 can be moved in the first axis "R1" direction along the support member fixing tube part 93. Therefore, a protruding amount of the first support member 81 protruded from the first gimbal frame extended part 86 to a side of the movable body 5 can be adjusted. When a protruding amount of the first support member 81 can be adjusted, a situation is easily avoided that the first support member 81 and the first concave curved face 61 of the plate holder 42 are separated from each other and the plate holder 42 is unable to be turnably supported by the gimbal frame 75.

In addition, in this embodiment, the reinforcement member 100 is provided with the adhesive injection hole 101, which is penetrated through the first reinforcement portion 100a in the "Z"-axis direction, and the communication groove 102 which is extended on a face on the first gimbal frame extended part 86 side along the first reinforcement portion 100a, the second reinforcement portion 100b and the third reinforcement portion 100c to be communicated with the adhesive injection hole 101. Therefore, when an adhesive is injected through the adhesive injection hole 101 in a state that the reinforcement member 100 and the first gimbal frame extended part 86 are brought into contact with each other, the adhesive is introduced into the communication groove 102. Further, the reinforcement member 100 and the first gimbal frame extended part 86 are fixed to each other by the adhesive which is introduced into the communication groove 102. Therefore, the reinforcement member 100 is easily fixed to the first gimbal frame extended part 86.

Further, in this embodiment, the reinforcement member 100 is provided with a pair of the first reinforcement member protruded parts 104, which are protruded toward a side of the movable body 5 on both sides of the first gimbal frame extended part 86 in the circumferential direction around the optical axis "L", and the second reinforcement member protruded part 105 which is protruded toward the movable body 5 side in the "–Z" direction with respect to the first gimbal frame extended part 86. On the other hand, the first gimbal frame extended part 86 is provided with a pair of the protruded parts 94 of the first gimbal frame extended part 86 which are protruded to both sides in the circumferential direction in the "–Z" direction with respect to a pair of the first reinforcement member protruded parts 104. Further, when viewed in the "Z"-axis direction, the second reinforcement member protruded part 105 and the third extended portion 86c of the first gimbal frame extended part 86 are overlapped with each other, and a pair of the first reinforcement member protruded parts 104 and a pair of the protruded parts 94 of the first gimbal frame extended part 86 are overlapped with each other. Therefore, the first gimbal frame extended part 86 can be prevented from disengaging from the reinforcement member 100 in the "+Z" direction by a pair of the first reinforcement member protruded parts 104 and a pair of the protruded parts 94 of the first gimbal frame extended part 86. Further, the first gimbal frame extended part 86 can be prevented from disengaging from the reinforcement member 100 in the "–Z" direction by the second reinforcement member protruded part 105.

In addition, in this embodiment, the gimbal mechanism 7 includes the second connection mechanism 77 which turnably connects the gimbal frame 75 with the fixed body 8 around the second axis "R2". The gimbal frame 75 is provided with a pair of the second gimbal frame extended parts 87 which are protruded from the frame main body part to both sides in the second axis "R2" direction and are extended in the "–Z" direction. A pair of the second gimbal frame extended parts 87 is located on the outer peripheral side with respect to the movable body 5. Further, the fixed body 8 is provided with the frame part 110 which surrounds the movable body 5, the turning support mechanism 6 and the gimbal frame 75 from the outer peripheral side. The second connection mechanism 77 includes the second support member 82, which is protruded from each of the diagonal portions of the frame part 110 in the second axis "R2" direction to a side of the gimbal frame 75 on the second axis "R2", and the second concave curved face 83 which is provided in each of a pair of the second gimbal frame extended parts 87 and is brought into contact with a tip end of the second support member 82. Therefore, the turning support mechanism 6 is turnably supported by the gimbal mechanism 7 around the second axis "R2".

Further, in this embodiment, the inner peripheral face 51a of the frame part 110 is provided with the moving range restriction part 145 (a pair of the side faces 120b of the groove part 120) which faces the reinforcement member 100 with the first space interposed therebetween in the circumferential direction and is capable of abutting with the reinforcement member 100 to restrict a moving range of the gimbal frame 75 when the gimbal frame 75 is displaced in the circumferential direction. Further, the frame part 110 is provided with the turning range restriction part 146 (bottom face 120a of the groove part 120) which faces the reinforcement member 100 with the second space interposed therebetween in the first axis "R1" direction and is capable of abutting with the reinforcement member 100 to restrict a turning range of the gimbal frame 75 when the gimbal frame 75 is turned around the second axis "R2". Therefore, in a case that an external force is applied or the like, a range that the gimbal frame 75 is moved in the circumferential direction and a range that the gimbal frame 75 is turned around the second axis "R2" can be restricted. Accordingly, deformation and damage of the gimbal frame 75 can be prevented or suppressed.

Modified Embodiments

Figure 14A:
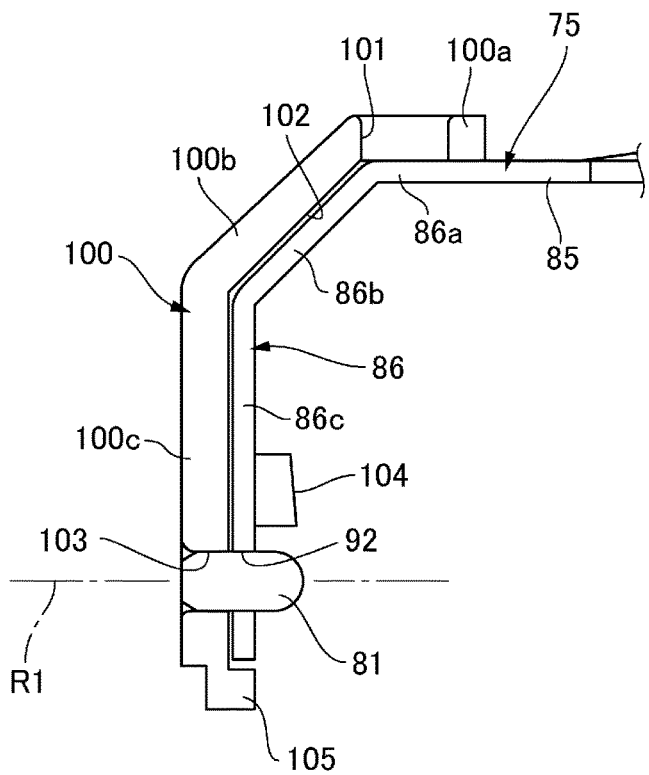
FIGS. 14A and 14B are explanatory views showing fixed portions of first support members in other examples.
Figure 14B:
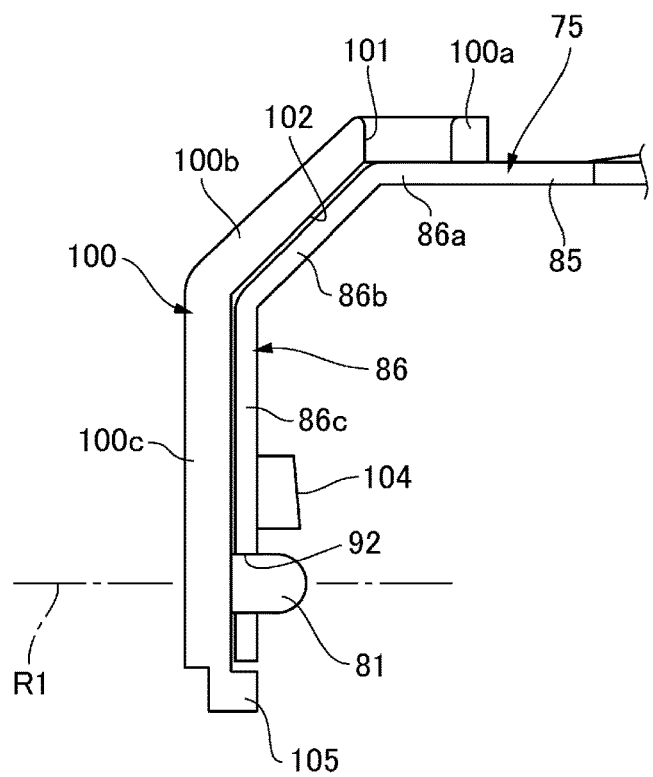

FIG. 14A is an explanatory view showing a structure that the first support member 81 of the first connection mechanism 76 is fixed to the reinforcement member 100, and FIG. 14B is an explanatory view showing a structure that the first support member 81 of the first connection mechanism 76 is fixed to the third extended portion 86c of the first gimbal frame extended part 86.

As shown in FIG. 14A, the first support member 81 may be fixed to the third reinforcement portion 100c of the reinforcement member 100. In this case, the third extended portion 86c of the first gimbal frame extended part 86 is provided with no support member fixing tube part 93. In the example shown in FIG. 14A, in a state that the first support member 81 is inserted into the reinforcement member through-hole 103 and the gimbal frame extended part through-hole 92, the first support member 81 is fixed to the reinforcement member 100 and the third extended portion 86c of the first gimbal frame extended part 86 and is protruded from the third extended portion 86c of the first gimbal frame extended part 86 to a side of the movable body 5. In other words, the reinforcement member through-hole 103 and the gimbal frame extended part through-hole 92 have sizes that the first support member 81 is fitted, and the first support member 81 is press-fitted to the reinforcement member through-hole 103 and the gimbal frame extended part through-hole 92.

According to this embodiment, the first support member 81 is held by the reinforcement member through-hole 103 and the gimbal frame extended part through-hole 92 which penetrate through in the first axis "R1" direction. Therefore, the first support member 81 can be moved in the first axis "R1" direction along the reinforcement member through-hole 103 and the gimbal frame extended part through-hole 92. As a result, a protruding amount of the first support member 81 which is protruded from the first gimbal frame extended part 86 to a side of the movable body 5 can be adjusted and thus, a contact pressure of the first support member 81 with the first concave curved face 61 of the plate holder 42 can be adjusted. Further, when a protruding amount of the first support member 81 can be adjusted, a situation is easily avoided that the first support member 81 and the first concave curved face 61 of the plate holder 42 are separated from each other and the plate holder 42 is unable to be turnably supported by the gimbal frame 75.

In the structure shown in FIG. 14A, the gimbal frame extended part through-hole 92 may be formed larger than an outer diameter dimension of the first support member 81. In this case, the first support member 81 is protruded from the third extended portion 86c of the first gimbal frame extended part 86 to a side of the movable body 5 in a state that the first support member 81 is not brought into contact with the third extended portion 86c of the first gimbal frame extended part 86. In other words, the first support member 81 is fixed to the reinforcement member 100 in a state that the first support member 81 is inserted into the reinforcement member through-hole 103 which penetrates through the third reinforcement portion 100c in the first axis "R1" direction. The first support member 81 fixed to the third reinforcement portion 100c is penetrated through the gimbal frame extended part through-hole 92 and is protruded from the third extended portion 86c of the first gimbal frame extended part 86 to a side of the movable body 5.

Also in this case, the first support member 81 is held by the reinforcement member through-hole 103 which penetrates in the first axis "R1" direction. Therefore, the first support member 81 can be moved in the first axis "R1" direction along the reinforcement member through-hole 103. As a result, a protruding amount of the first support member 81 which is protruded from the first gimbal frame extended part 86 to a side of the movable body 5 can be adjusted and thus, a contact pressure of the first support member 81 with the first concave curved face 61 of the plate holder 42 can be adjusted. Further, when a protruding amount of the first support member 81 can be adjusted, a situation is easily avoided that the first support member 81 and the first concave curved face 61 of the plate holder 42 are separated from each other and the plate holder 42 is unable to be turnably supported by the gimbal frame 75.

Alternatively, as shown in FIG. 14B, the first support member 81 may be fixed to the third extended portion 86c of the first gimbal frame extended part 86. In this case, the reinforcement member 100 is provided with no reinforcement member through-hole 103. On the other hand, the gimbal frame extended part through-hole 92 provided in the third extended portion 86c of the first gimbal frame extended part 86 has a size so that the first support member 81 is fitted.

In this embodiment, the first support member 81 is fixed to the third extended portion 86c of the first gimbal frame extended part 86 in a state that the first support member 81 is inserted into the gimbal frame extended part through-hole 92. Fixing of the first support member 81 to the third extended portion 86c of the first gimbal frame extended part 86 may be performed by welding or the like. In this case, when the first support member 81 is to be fixed to the third extended portion 86c of the first gimbal frame extended part 86, the first support member 81 may be structured of a spherical body similarly to the second support member 82 and fixed to the third extended portion 86c of the first gimbal frame extended part 86.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function comprising:
   a movable body comprising a lens;
   a turning support mechanism structured to turnably support the movable body around an optical axis of the lens;
   a gimbal mechanism structured to turnably support the turning support mechanism around a first axis intersecting the optical axis and turnably support the turning support mechanism around a second axis intersecting the optical axis and the first axis;
   a fixed body which supports the movable body through the gimbal mechanism and the turning support mechanism;
   a shake correction magnetic drive mechanism structured to turn the movable body around the first axis and around the second axis; and
   a rolling correction magnetic drive mechanism structured to turn the movable body around the optical axis;
   wherein the turning support mechanism comprises:
      a plate roll which is fixed to the movable body;
      a plate holder comprising a facing part which faces the plate roll in a direction of the optical axis; and
      a turning mechanism which is provided between the plate roll and the facing part and is structured so that the plate roll is turnable with respect to the plate holder around the optical axis;
   wherein the gimbal mechanism comprises:
      a gimbal frame; and
      a first connection mechanism which turnably connects the plate holder with the gimbal frame around the first axis;
   wherein the first connection mechanism comprises:
      a first support member which is protruded from the gimbal frame to a side of the plate holder on the first axis; and
      a first concave curved face which is provided in the plate holder and is turnably brought into contact with a tip end of the first support member; and
   wherein a reinforcement member is fixed to the gimbal frame so that a portion of the gimbal frame where the first axis is passed is reinforced.

2. The optical unit with a shake correction function according to claim 1, wherein
   when one side in a direction of the optical axis is defined as a first direction and an other side in the direction of the optical axis is defined as a second direction,
   the gimbal frame comprises:
      a gimbal frame main body part which is located in the second direction with respect to the plate holder; and
      a pair of first gimbal frame extended parts which are protruded from the gimbal frame main body part to both sides in a direction of the first axis and are extended in the first direction,
   the pair of the first gimbal frame extended parts is located on an outer peripheral side with respect to the movable body,
   each of the pair of the first gimbal frame extended parts comprises:
      a first extended portion of the first gimbal frame extended part which is extended in a direction separated from the gimbal frame main body part in the direction of the first axis;
      a second extended portion of the first gimbal frame extended part which is inclined in the first direction from a tip end of the first extended portion of the first gimbal frame extended part toward a direction separated from the gimbal frame main body part; and
      a third extended portion of the first gimbal frame extended part which is extended in the first direction from an end in the first direction of the second extended portion of the first gimbal frame extended part on the outer peripheral side with respect to the plate holder, the first support member is protruded to a side of the movable body from the third extended portion of the first gimbal frame extended part, the reinforcement member is fixed to each of the first gimbal frame extended parts, and the reinforcement member comprises:
- a first reinforcement portion which is located in the second direction with respect to the first extended portion of the first gimbal frame extended part;
- a second reinforcement portion which is extended from an end on the outer peripheral side of the first reinforcement portion along the second extended portion of the first gimbal frame extended part; and
- a third reinforcement portion which is extended along the third extended portion of the first gimbal frame extended part from an end in the first direction of the second extended portion of the first gimbal frame extended part.

3. The optical unit with a shake correction function according to claim 2, wherein a thickness of the reinforcement member is thicker than a thickness of the first gimbal frame extended part in a laminated direction in a state that the first gimbal frame extended part and the reinforcement member are overlapped with each other.

4. The optical unit with a shake correction function according to claim 3, wherein the third extended portion of the first gimbal frame extended part comprises:
- a gimbal frame extended part through-hole which penetrates through the third extended portion in a direction of the first axis; and
- a support member fixing tube part which is protruded to an opposite side to the movable body in the direction of the first axis from an opening edge of the gimbal frame extended part through-hole in the third extended portion of the first gimbal frame extended part, the third reinforcement portion comprises a reinforcement member through-hole which penetrates through the third reinforcement portion in the direction of the first axis and is communicated with the gimbal frame extended part through-hole and, the support member fixing tube part being inserted into the reinforcement member through-hole, and the first support member is held by the support member fixing tube part and is protruded from the third extended portion of the first gimbal frame extended part.

5. The optical unit with a shake correction function according to claim 3, wherein the first support member is fixed to the third extended portion of the first gimbal frame extended part.

6. The optical unit with a shake correction function according to claim 3, wherein the third extended portion of the first gimbal frame extended part comprises a gimbal frame extended part through-hole which penetrates through the third extended portion in the direction of the first axis, the third reinforcement portion comprises a reinforcement member through-hole which penetrates through the third reinforcement portion in the direction of the first axis and is communicated with the gimbal frame extended part through-hole, the first support member is inserted into the reinforcement member through-hole and is fixed to the reinforcement member, and the first support member penetrates through the gimbal frame extended part through-hole and protrudes from the third extended portion of the first gimbal frame extended part to a side of the movable body.

7. The optical unit with a shake correction function according to claim 3, wherein the third extended portion of the first gimbal frame extended part comprises a gimbal frame extended part through-hole which penetrates through the third extended portion in the direction of the first axis, the third reinforcement portion comprises a reinforcement member through-hole which penetrates through the third reinforcement portion in the direction of the first axis and is communicated with the gimbal frame extended part through-hole, the first support member is inserted into the gimbal frame extended part through-hole and the reinforcement member through-hole and is fixed to the third extended portion of the first gimbal frame extended part and the reinforcement member, and the first support member is protruded to a side of the movable body from the third extended portion of the first gimbal frame extended part.

8. The optical unit with a shake correction function according to claim 3, wherein the reinforcement member comprises:
- an adhesive injection hole which penetrates through the first reinforcement portion in the direction of the optical axis; and
- a communication groove which is extended along the first reinforcement portion, the second reinforcement portion and the third reinforcement portion on a surface of a side of the first gimbal frame extended part and is communicated with the adhesive injection hole.

9. The optical unit with a shake correction function according to claim 3, wherein the reinforcement member comprises:
- a pair of first reinforcement member protruded parts which are protruded toward a side of the movable body on both sides of the first gimbal frame extended part in a circumferential direction around the optical axis; and
- a second reinforcement member protruded part which is protruded toward the side of the movable body in the first direction of the first gimbal frame extended part, the first gimbal frame extended part comprises a pair of protruded parts of the first gimbal frame extended part protruded to both sides in the circumferential direction in the first direction with respect to the pair of the first reinforcement member protruded parts, the second reinforcement member protruded part and the third extended portion of the first gimbal frame extended part are overlapped with each other when viewed in the direction of the optical axis, and the pair of the first reinforcement member protruded parts and the pair of the protruded parts of the first gimbal frame extended part are overlapped with each other when viewed in the direction of the optical axis.

10. The optical unit with a shake correction function according to claim 3, wherein the gimbal mechanism comprises a second connection mechanism which turnably connects the gimbal frame with the fixed body around the second axis, the gimbal frame comprises a pair of second gimbal frame extended parts which are protruded from the gimbal frame main body part to both sides in a direction of the second axis and are extended in the first direction, the pair of the second gimbal frame extended parts is located on an outer peripheral side with respect to the movable body, the fixed body comprises a frame part which surrounds the movable body, the plate holder and the gimbal frame from the outer peripheral side, and the second connection mechanism comprises:
- a second support member which is protruded to a side of the gimbal frame on the second axis from each of diagonal portions of the frame part in a direction of the second axis; and
- a second concave curved face which is provided in each of the pair of the second gimbal frame extended parts and is brought into contact with a tip end of the second support member.

11. The optical unit with a shake correction function according to claim 10, wherein an inner peripheral face of the frame part comprises:
- a moving range restriction part which faces the reinforcement member through a first space in a circumferential direction and is abutted with the reinforcement member when the gimbal frame is displaced in the circumferential direction to restrict a moving range of the gimbal frame; and
- a turning range restriction part which faces the reinforcement member through a second space in a direction of the first axis and is abutted with the reinforcement member when the gimbal frame is turned around the second axis to restrict a turning range of the gimbal frame.

12. The optical unit with a shake correction function according to claim 2, wherein
the third extended portion of the first gimbal frame extended part comprises:
- a gimbal frame extended part through-hole which penetrates through the third extended portion in a direction of the first axis; and
- a support member fixing tube part which is protruded to an opposite side to the movable body in the direction of the first axis from an opening edge of the gimbal frame extended part through-hole provided in the third extended portion of the first gimbal frame extended part, the third reinforcement portion comprises a reinforcement member through-hole which penetrates through the third reinforcement portion in the direction of the first axis and is communicated with the gimbal frame extended part through-hole and, the support member fixing tube part being inserted into the reinforcement member through-hole, and the first support member is held by the support member fixing tube part and is protruded from the third extended portion of the first gimbal frame extended part.

13. The optical unit with a shake correction function according to claim 2, wherein the first support member is fixed to the third extended portion of the first gimbal frame extended part.

14. The optical unit with a shake correction function according to claim 2, wherein
the third extended portion of the first gimbal frame extended part comprises a gimbal frame extended part through-hole which penetrates through the third extended portion in the direction of the first axis, the third reinforcement portion comprises a reinforcement member through-hole which penetrates through the third reinforcement portion in the direction of the first axis and is communicated with the gimbal frame extended part through-hole, the first support member is inserted into the reinforcement member through-hole and is fixed to the reinforcement member, and the first support member penetrates through the gimbal frame extended part through-hole and protrudes from the third extended portion of the first gimbal frame extended part to a side of the movable body.

15. The optical unit with a shake correction function according to claim 2, wherein
the third extended portion of the first gimbal frame extended part comprises a gimbal frame extended part through-hole which penetrates through the third extended portion in the direction of the first axis, the third reinforcement portion comprises a reinforcement member through-hole which penetrates through the third reinforcement portion in the direction of the first axis and is communicated with the gimbal frame extended part through-hole, the first support member is inserted into the gimbal frame extended part through-hole and the reinforcement member through-hole and is fixed to the third extended portion of the first gimbal frame extended part and the reinforcement member, and the first support member is protruded to a side of the movable body from the third extended portion of the first gimbal frame extended part.

16. The optical unit with a shake correction function according to claim 2, wherein the reinforcement member comprises:
- an adhesive injection hole which penetrates through the first reinforcement portion in the direction of the optical axis; and
- a communication groove which is extended along the first reinforcement portion, the second reinforcement portion and the third reinforcement portion on a surface of a side of the first gimbal frame extended part and is communicated with the adhesive injection hole.

17. The optical unit with a shake correction function according to claim 2, wherein
the reinforcement member comprises:
- a pair of first reinforcement member protruded parts which are protruded toward a side of the movable body on both sides of the first gimbal frame extended part in a circumferential direction around the optical axis; and
- a second reinforcement member protruded part which is protruded toward the side of the movable body in the first direction of the first gimbal frame extended part, the first gimbal frame extended part comprises a pair of protruded parts of the first gimbal frame extended part protruded to both sides in the circumferential direction in the first direction with respect to the pair of the first reinforcement member protruded parts, the second reinforcement member protruded part and the third extended portion of the first gimbal frame extended part are overlapped with each other when viewed in the direction of the optical axis, and the pair of the first reinforcement member protruded parts and the pair of the protruded parts of the first gimbal frame extended part are overlapped with each other when viewed in the direction of the optical axis.

18. The optical unit with a shake correction function according to claim 2, wherein
the gimbal mechanism comprises a second connection mechanism which turnably connects the gimbal frame with the fixed body around the second axis,
the gimbal frame comprises a pair of second gimbal frame extended parts which are protruded from the gimbal frame main body part to both sides in a direction of the second axis and are extended in the first direction,
the pair of the second gimbal frame extended parts is located on an outer peripheral side with respect to the movable body,
the fixed body comprises a frame part which surrounds the movable body, the plate holder and the gimbal frame from the outer peripheral side, and
the second connection mechanism comprises:
a second support member which is protruded to a side of the gimbal frame on the second axis from each of diagonal portions of the frame part in a direction of the second axis; and
a second concave curved face which is provided in each of the pair of the second gimbal frame extended parts and is brought into contact with a tip end of the second support member.

19. The optical unit with a shake correction function according to claim 18, wherein an inner peripheral face of the frame part comprises:
a moving range restriction part which faces the reinforcement member through a first space in a circumferential direction and is abutted with the reinforcement member when the gimbal frame is displaced in the circumferential direction to restrict a moving range of the gimbal frame; and
a turning range restriction part which faces the reinforcement member through a second space in a direction of the first axis and is abutted with the reinforcement member when the gimbal frame is turned around the second axis to restrict a turning range of the gimbal frame.

\* \* \* \* \*